United States Patent
Prang et al.

(10) Patent No.: US 12,361,365 B2
(45) Date of Patent: Jul. 15, 2025

(54) LOGISTICS SYSTEM FOR SHIPPING ITEMS BY MEANS OF A VEHICLE, METHOD FOR OPERATING A LOGISTICS SYSTEM, AND VEHICLE

(71) Applicant: Volkswagen Aktiengesellschaft, Wolfsburg (DE)

(72) Inventors: Rüdiger Prang, Braunschweig (DE); Horst Oehlschlaeger, Braunschweig (DE); Claus Bertram Bonerz, Sulzbach a. Tanus (DE); Robin Stoletzki, Nienhagen (DE); Johannes Altach, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1034 days.

(21) Appl. No.: 17/422,558

(22) PCT Filed: Dec. 9, 2019

(86) PCT No.: PCT/EP2019/084288
§ 371 (c)(1),
(2) Date: Jul. 13, 2021

(87) PCT Pub. No.: WO2020/148022
PCT Pub. Date: Jul. 23, 2020

(65) Prior Publication Data
US 2022/0101244 A1    Mar. 31, 2022

(30) Foreign Application Priority Data

Jan. 16, 2019 (DE) .................... 10 2019 200 504.7

(51) Int. Cl.
*G06Q 10/083* (2024.01)
*B60H 1/00* (2006.01)
(Continued)

(52) U.S. Cl.
CPC ....... *G06Q 10/083* (2013.01); *B60H 1/00964* (2013.01); *B60P 1/6445* (2013.01); *B65G 1/06* (2013.01); *B65G 1/1373* (2013.01)

(58) Field of Classification Search
CPC .................................. B65G 1/06; B65G 1/373
See application file for complete search history.

(56) References Cited

U.S. PATENT DOCUMENTS

| 2009/0272623 | A1* | 11/2009 | Berdelle-Hilge | ......... B07C 1/00 198/370.01 |
| 2017/0291766 | A1 | 10/2017 | Orth et al. | |

(Continued)

FOREIGN PATENT DOCUMENTS

| CN | 106185151 A | 12/2016 | ............. B65H 1/127 |
| CN | 206653973 U | 11/2017 | ................ B60P 1/00 |

(Continued)

OTHER PUBLICATIONS

Alamy Limited, "Lower Saxony. Hanover: At Volkswagen's stand at 1-15 the IAA Commercial Vehicles. an employee removes a box from the model showing the 'Milentro' device for home delivery applications. The International Motor Show (IAA) is one of the largest motor shows in the world and will take place," URL: https://www.alamy.com/19-september-2018-lower-saxony-hanover-at-volkswagens-stand-at-the-iaa-commercial-vehicles-an-employee-removes-a-box-from-the-model-showing-the-milentro-device-for-home-delivery-applications-the-international-motor-show-iaa-is-one-of-the-largest-motor-shows-in-the-world-and-will-take-place-in-hanover-until-27-september-photo-hauke-christian-dittrichdpa-image219363909.html, 3 pages, Sep. 19, 2018.

(Continued)

*Primary Examiner* — Saul Rodriguez
*Assistant Examiner* — Willie W Berry, Jr.
(74) *Attorney, Agent, or Firm* — Slayden Grubert Beard PLLC

(57) ABSTRACT

A logistics system is provided for shipping items using a vehicle. A system of this type comprises: an item supply (Continued)

system which is designed to be transported in a vehicle; and a data management system which is designed to link at least one item, present in at least one position in the item supply system, with at least information from at least one sales order, and is designed to link all components of the logistics system with at least one external input or output device such that they interact. Depending on the information from the at least one sales order, the at least one position of the at least one item in the item supply system is variable, and the at least one item is removably stored in the item supply system.

18 Claims, 15 Drawing Sheets

(51) Int. Cl.
*B60P 1/64* (2006.01)
*B65G 1/06* (2006.01)
*B65G 1/137* (2006.01)

(56) References Cited

U.S. PATENT DOCUMENTS

| | | | |
|---|---|---|---|
| 2017/0300857 A1 | 10/2017 | Cheng et al. | |
| 2018/0189694 A1 | 7/2018 | Mattingly et al. | |
| 2018/0189724 A1 | 7/2018 | Mattingly et al. | |
| 2018/0330313 A1 | 11/2018 | Clarke et al. | |
| 2019/0050951 A1* | 2/2019 | Goldberg | A47J 36/32 |

FOREIGN PATENT DOCUMENTS

| | | | | |
|---|---|---|---|---|
| CN | 107572172 A | 1/2018 | | B65G 1/04 |
| CN | 107844941 A | 3/2018 | | G06Q 10/08 |
| DE | 19809291 A1 | 9/1999 | | B60P 1/36 |
| DE | 102006025876 A1 | 12/2007 | | B60P 1/36 |
| DE | 102012205812 A1 | 10/2013 | | B60P 1/02 |
| DE | 102016004970 A1 | 2/2017 | | G06Q 10/08 |
| DE | 102016009240 A1 | 2/2017 | | G01C 21/34 |
| DE | 202018006094 U1 | 3/2019 | | B60P 3/025 |
| DE | 102019200504 A1 | 7/2020 | | F25D 11/00 |
| EP | 3228496 A2 | 10/2017 | | B60P 3/00 |
| KR | 101884597 B1 | 8/2018 | | B60P 1/36 |
| WO | 2020/148022 A1 | 7/2020 | | B65G 1/04 |

OTHER PUBLICATIONS

Anonymous: "Niedersächsiches Forchungszentrum Fahrzeugtechhnik (NFF) Vorbereitungen zur ExU-Begehung der TU Braunschweig am Campus Forschungsflughafen," Facebook Video, URL: https://www.facebook.com/watch/?v=317676478914572&form=MY01SV &OCID=MY01SV, 2 pages (German w/ English abstract), Apr. 25, 2019.

German Office Action, Application No. 102019200504.7, 5 pages, Oct. 31, 2019.

International Search Report and Written Opinion, Application No. PCT/EP2019/084288, 24 pages, Feb. 5, 2020.

Chinese Office Action, Application No. 201980089389.2, 15 pages, Oct. 7, 2023.

* cited by examiner

LOGISTICS SYSTEM FOR SHIPPING ITEMS BY MEANS OF A VEHICLE, METHOD FOR OPERATING A LOGISTICS SYSTEM, AND VEHICLE

CROSS-REFERENCE TO RELATED APPLICATIONS

This application claims priority to German Patent Application No. DE 10 2019 200 504.7, filed on Jan. 16, 2019 with the German Patent and Trademark Office. The contents of the aforesaid Patent Application are incorporated herein for all purposes.

TECHNICAL FIELD

The invention relates to a logistics system for shipping items by means of a vehicle, to a method for operating a logistics system, and to a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Delivery service providers of all kinds are flourishing amid ever more dynamic ways of life. These delivery service providers are adapting ever more dynamically to everyday tasks. One particular group among delivery service providers, so-called "home delivery", is specialized in shipping items directly to the respective recipients. The increasing flows of goods in this sector may necessitate concepts for optimizing the distribution process itself, in order to reduce the traffic and emissions associated therewith, for example. Today, the entire process is still too slow, thus requiring long distribution periods, which translates into many vehicles and drivers. Conventional optimization solutions, for example mathematical calculations for planning as well as the hub solutions used, may only deal with the emerging complexity to a limited extent.

SUMMARY

An object exists to provide a logistics system for shipping items by means of a vehicle, which system ensures efficient and customer-friendly operation. In addition, an object exists to provide a method for operating a logistics system of this kind as well as a corresponding vehicle.

The objects are at least partly solved by the subject matter according to the independent claims. Embodiments of the invention are described in the dependent claims, the following description, and the drawings.

DESCRIPTION

Figure 1:
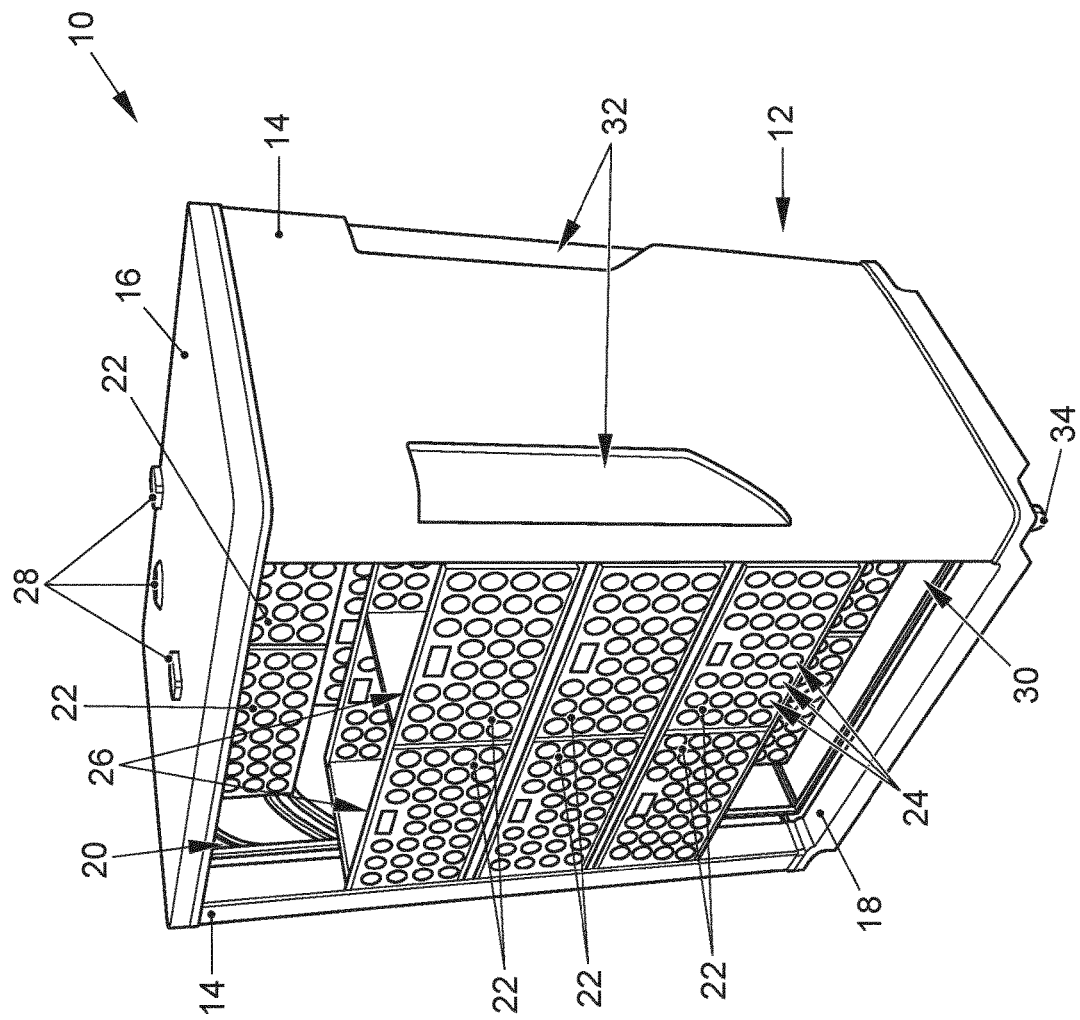
FIG. 1 is a schematic and exemplary representation of a transport device of an item supply system of a logistics system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a logistics system is provided for shipping items by means of a vehicle. A logistics system of this type comprises an item supply system which is designed to be transported in a vehicle, and a data management system which is designed to link at least one item, present in at least one position in the item supply system, with at least one piece of information from at least one sales order, and is designed to link all components of the logistics system with at least one external input or output device such that they interact, wherein the at least one position of the at least one item in the item supply system is variable depending on the at least one piece of information from the at least one sales order, and so the at least one item is removably stored in the item supply system, wherein the data management system is also designed such that it always has available a current state of the at least one piece of information from the at least one sales order.

In this way, efficient and customer-friendly operation may, e.g., be ensured during shipping of items by means of a vehicle, since an ideal positioning of the items to be shipped is always made possible for a user. For example, as a result, a position of the item may be changed accordingly even during travel based on an updated piece of information in the sales order such that said item may be accessed more quickly and more conveniently. Since all components of the system are interconnected, various information is linked in a user-friendly manner, such that a current state of the piece of information from the at least one sales order may be updated particularly well by virtue of this interconnectedness.

It is also possible in some embodiments, via the at least one external input or output device, to operate the data management system such that one or more users may submit targeted requests or wishes to the logistics system in order to make the shipping process efficient. The input or output devices provided may comprise any technical solutions relating to modern communication instruments or themselves be a part thereof. For example, these devices may be supported by a computer or themselves at least partially comprise a computer infrastructure. It is also conceivable for said devices, e.g., to be integrated in a vehicle architecture or to be a component of a vehicle-external device. For example, an input device may be present exclusively or partially as a program code and accordingly as an interactive image module on a display. Furthermore, the devices may at least partially have a voice routine function, such that inputs or outputs may be reproduced phonetically or acoustically. Haptic input commands may also be provided. In addition, a user could for example be supported during interpretation via visual functions of such devices. Ultimately, many variants of input and output devices are conceivable and the invention is not limited in this respect to any appreciable extent and should be understood to be compatible with the above-mentioned and other variants of such devices.

In some embodiments, a method for operating a logistics system. A method of this kind comprises the following steps: supplying at least one item in at least one position in an item supply system, linking the at least one item with at least one piece of information from at least one sales order by means of a data management system. The method also comprises the following additional steps: checking, by means of the data management system, whether the at least one piece of information from the at least one sales order has been changed, automatically changing the at least one position of the at least one item in the item supply system depending on the at least one piece of information from the at least one sales order. The above-mentioned benefits also apply to the method in so far as they are transferable.

In some embodiments, a vehicle is provided which is designed to accommodate the logistics system as discussed herein and to releasably integrate the logistics system at least in part in a body of the vehicle. The above-mentioned benefits also apply to the vehicle in so far as they are transferable.

Further embodiments result for example from the remaining features specified in the dependent claims.

In some embodiments, the item supply system comprises at least one receiving device and at least one transport device, wherein the at least one receiving device is designed to receive the at least one transport device, wherein the transport device comprises a movement device and at least one item storage unit, which is designed to receive at least one item, wherein the movement device is designed to move the at least one item storage unit into at least one user-defined position in the transport device, such that the at least one position of the at least one item in the item supply system is variable depending on the at least one piece of information from the at least one sales order, and so the at least one item is removably stored in the item supply system. In this respect, the system presented is designed as a modular system such that an item to be shipped may be picked out in a particularly targeted manner and then moved out. For example, the individual item storage units may be removed and may be exchanged quickly, such that action may be taken quickly when the information in the sales order changes. In the same vein, the individual transport devices may for example also be removed quickly from a receiving device and provided accordingly for efficient shipping of an item depending on information that is being updated. For example, the movement device inside the transport device makes it possible to provide an item at a user-defined position in an even more targeted manner, which in turn makes it possible to quickly remove the item. For example, this may be a position which allows or facilitates quick unloading of a specific item from the vehicle used during shipping. For example, a changing piece of information relating to a planned arrival time at a destination may be taken into consideration such that the movement device moves an associated item in a precise manner to a dispensing position within the system prior to arrival at the destination. The data management system itself may have navigation components of this kind or, due to the high degree of interconnectedness with all components of the system itself and with additional components of the vehicle, for example the navigation device of the vehicle, take this piece of information about the travel route and generally about the location of the items relative to the destination into account.

In some embodiments, the at least one receiving device comprises at least one thermal management device, which is designed to control the temperature of the at least one transport device and the at least one item storage unit as defined by the user at at least one position in the item supply system, wherein the thermal management device may be operated autonomously and/or via at least one interface by means of at least one external thermal management device. In this way, the items may be kept in the desired condition during transportation or beforehand and afterwards, making shipping even more customer-friendly. Depending on how many transport devices are used, a corresponding number of stowing spaces may be provided, the temperature of which may be controlled in a targeted and different manner in each case. Insulating walls of the receiving device may facilitate the desired temperature control and allow for energy-efficient operation. Furthermore, the individual stowing spaces may be at least partially separated by means of removable partitions, such that different temperature conditions of the individual regions may be maintained.

In some embodiments, the movement device comprises a paternoster device or at least partially comprises a paternoster device. The items present in the item storage units may therefore be very quickly and easily positioned in the confined space of the transport device, thus allowing for customer-friendly shipping. A paternoster device of this kind may for example be moved by means of an electric motor, wherein a control unit for example assists with the connection to the data management system. The item storage units may for example be made of plastics material or metal.

However, other materials are also conceivable, such as wood, and even combinations of materials are conceivable. The paternoster device may be designed in a known manner in a similar way to a conventional paternoster but also integrate additional components such that provision is improved even further. In addition, the paternoster device used may for example comprise a space-optimized paternoster solution with automated dispensing that prevents the customer's order from being picked a second time. The paternoster device may for example comprise a belt drive that may be operated by means of an electric motor or any desired drive unit.

In some embodiments, the at least one transport device and the receiving device may each comprise at least one interface that is designed to connect the at least one transport device to the receiving device, such that energy and/or data may be transmitted between the transport device and the receiving device and such that a connection may be established between the transport device and the thermal management device. Interfaces of this kind may be designed in a wide variety of ways, provided that reliable functioning is ensured. This makes cross-component interaction, which is for example coordinated centrally by the data management system, even simpler to achieve. For example, a driver may thus monitor the condition of the items in real time during a journey via an output device.

In some embodiments, the receiving device comprises at least one locking unit, such that the at least one transport device may be securely positioned as defined by the user at at least one position in the receiving device. A locking unit of this kind may also be referred to as a latching strip element. As such, for example during transportation on the vehicle, it may be ensured that the items may be shipped to the destination undamaged and in a desired condition.

In some embodiments, the receiving device comprises at least one opening device that is positioned such that the at least one item may be accessed when the at least one item storage unit reaches at least one user-defined position by means of the movement device depending on the at least one piece of information from the at least one sales order. For example, an opening device may be designed in the form of a simple cargo hatch. An associated opening mechanism may comprise all known variations. For example, an integral flap that may pivot about a hinge strip may be provided, which flap may additionally be locked on the outer wall regions of the receiving device such that targeted access to the items is made possible in a customer-friendly and efficient manner.

In some embodiments, the at least one opening device comprises at least one signal device, such that a signal may be triggered and perceptibly set by the signal device when the at least one item storage unit has reached at least one user-defined position by means of the movement device depending on the at least one piece of information from the at least one sales order. For example, the signal device may be a lamp in any form, for example one or more light-emitting diodes. A sound and/or vibration function is also conceivable, and a combination of functions is also conceivable. The signal may additionally be displayed on an external input and output device. A user may therefore quickly and easily identify where the next item to be delivered is being stored, for example in the case where multiple opening devices are provided. Quicker access beneficially facilitates customer-friendly shipping. If, during shipping, updates are still being made to the information in the sales order, these current changes may also be taken into account. For example, different signals may indicate an order for removing the items. During the first removal, the movement device may already bring an item into a desired position in the adjacent transport device such that the second removal may then take place at another opening device indicated by the second signal. During this time, the transport device operated first may again move another item into a user-defined position by means of the movement device provided there, such that targeted removal according to the sales order may take place quickly and efficiently. As a result, quick and efficient shipping is facilitated and made possible particularly well.

In some embodiments, the at least one transport device comprises an at least partially closable outer shell, such that at least one item may be accessed by means of an access device as defined by the user and wherein the at least one transport device comprises a roller device, such that the at least one transport device may be movably stored by means of the roller device. A closable outer shell of this kind may for example be opened and closed as a whole or comprise individual subregions that may be closed in and of themselves. An associated closing mechanism may for example be based on a simple lock-and-key principle. However, other devices that may be unlocked by means of a number code of a similar input are also conceivable. A fingerprint routine or voice recognition may also unlock an associated unlocking mechanism.

In this way, a selected transport device may be stowed at a destination and individual users may then remove their items ordered previously via the data management system at different times.

In some embodiments, the at least one piece of information from at least one sales order is at least selected from the following: delivery location, delivery time, delivery interval, delivery condition of the at least one item, order number, shipping position relative to at least one other item stored in the item supply system. For example, it is also conceivable for specific additional information to be generated via the sales order and then taken into account based on the above-mentioned information as well as additional information, for example from a relevant vehicle or the more immediate surroundings. For example, a delivery time may be dynamically adapted depending on a traffic situation. A current order number may also be pushed back or overwritten if an urgent order or a more convenient shipping route changes the routine that was set previously. Accordingly, the items may each be moved such that particularly quick and customer-friendly delivery of the items is possible during removal at the relevant destination.

In some embodiments, the at least one thermal management device comprises at least one air supply duct device and at least one exhaust air duct device, such that a corresponding air flow may be generated for user-defined temperature control. As already mentioned above, the temperature of different regions of the receiving device may be controlled depending on a position of a transport device that has been stowed. The air supply duct device and the exhaust air duct device may accordingly be designed to provide, for example, at least four different temperature zones. As a result, a relevant item may be conditioned particularly well in accordance with current customer wishes, such that a desired delivery condition of the item may be ensured in a timely and particularly efficient manner.

In some embodiments, the at least one air supply duct device comprises at least one air supply duct and the exhaust air duct device comprises at least one exhaust air duct and wherein the air supply duct device comprises at least one control device, such that an air flow in the at least one air supply duct and in the at least one exhaust air duct may be controlled in a user-defined manner. A desired, user-defined condition of an item that depends on a current piece of information in the sales order may thus be achieved even better.

In some embodiments, the relevant at least one interface of the transport device and of the receiving device are designed to be compatible with one another and may either be connected with one another via a coupling mechanism and/or are designed to at least partially allow contactless transmission of energy and/or data and/or to at least partially allow a contactless connection between the transport device and the thermal management device.

The logistics system presented above may for example be used in a variety of vehicles, for example in commercial vehicles, wherein a wide variety of sizes and designs of the vehicles are conceivable. For example, the system may generally be applied and used by logistics companies or by food retailers. For example, the C/D class may be provided for the commercial vehicles, but similar or other vehicle classes with different variants in terms of the chassis and cab are also conceivable. The logistics system presented above may also be referred to as an automated or semi-automated fresh produce logistics system for operation in motor vehicles.

The various embodiments mentioned herein may be combined with one another, if not stated otherwise in individual cases.

The invention will be explained in exemplary embodiments below based on the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 is a schematic representation of a transport device 10 of an item supply system 38 (not shown here) of a logistics system (not shown here). Said transport device 10 comprises a main body 12, which has two side walls 14, a top element 16 and a base element 18. In this perspective representation, a detail of a movement device 20 may also be seen on the inner side of the rear side wall, viewed relative to the image plane. The movement device 20 moves the item storage units 22 shown from bottom to top in order to then move them laterally over the zenith point to the opposite side, where they are moved from top to bottom. In other words, the movement device 20 is shown to be a type of paternoster device. The item storage units 22 are each shown to be in packs of two between the side walls 14. The item storage units 22 are shown to be substantially rectangular, wherein the two item storage units 22 shown in parallel next to one another almost completely fill the space between the two side walls. The side walls of the item storage units 22 oriented towards an outer side of the transport device 10 comprise opening regions 24 that are shown to be substantially circular. Only one opening region 24 is formed so as to be substantially rectangular on the edge in order to provide the function of a grip. By virtue of the totality of opening regions 24, it is possible to look inside the respective item storage units 22 in order to be able to view the items stored therein from the outside. The respective broad sides 26 of the item storage units 22 are dimensioned such that a total of two item storage units 22 almost completely occupy a broad side of a side wall. Only minimal space is provided between two packs of two in order to ensure smooth running of the movement device 20. The packs of two are moved over the zenith point and then lowered again on the other side, wherein said minimal space remains free substantially below the zenith point such that the packs of two do not rub against one another. In other words, the substantially rectangular transport device is almost completely occupied by the item storage units 22 provided therein, and therefore the spatial volume is utilized in a particularly efficient manner. It is also conceivable for the individual item storage units 22 to be pulled out from the side of the transport device 10 in order to enable easier access to the items placed therein. It is also conceivable for the respective item storage units 22 to be pulled out completely, such that they then serve as a separate transport means in order, for example, to finally pick the items or to provide the item storage unit 22 to an end client at least temporarily.

In addition, three interfaces 28 are shown in the top element 16 which are designed to enable energy and data transmission to a receiving device (not shown here). In addition, at least one of the three interfaces 28 may be designed to be connected to a thermal management device (not shown here), such that user-defined temperature control of the items stored in the transport device 10 is possible. For example, on account of the item storage units 22 that are movably stored by means of the movement device 20, it is possible to control the temperature of the items stored in different item storage units 22 differently, since they are acted on by means of the interface 28 from top to bottom. A data management system (not shown here) may supportively manage or control this process. In this connection, the base element 18 comprises a recessed region 30, such that air may for example circulate from bottom to top or vice versa via said recessed region 30 in order to support a user-defined temperature control process or procedure.

The front side wall 14 shown additionally comprises two indented regions 32 provided laterally approximately in the center which may be used as a form of grip such that the transport device 10 may be pushed better. The transport device 10 also comprises rollers 34 for pushing processes of this kind, wherein only one of said, for example four, rollers 34 is shown in the front region in FIG. 1.

Figure 2:
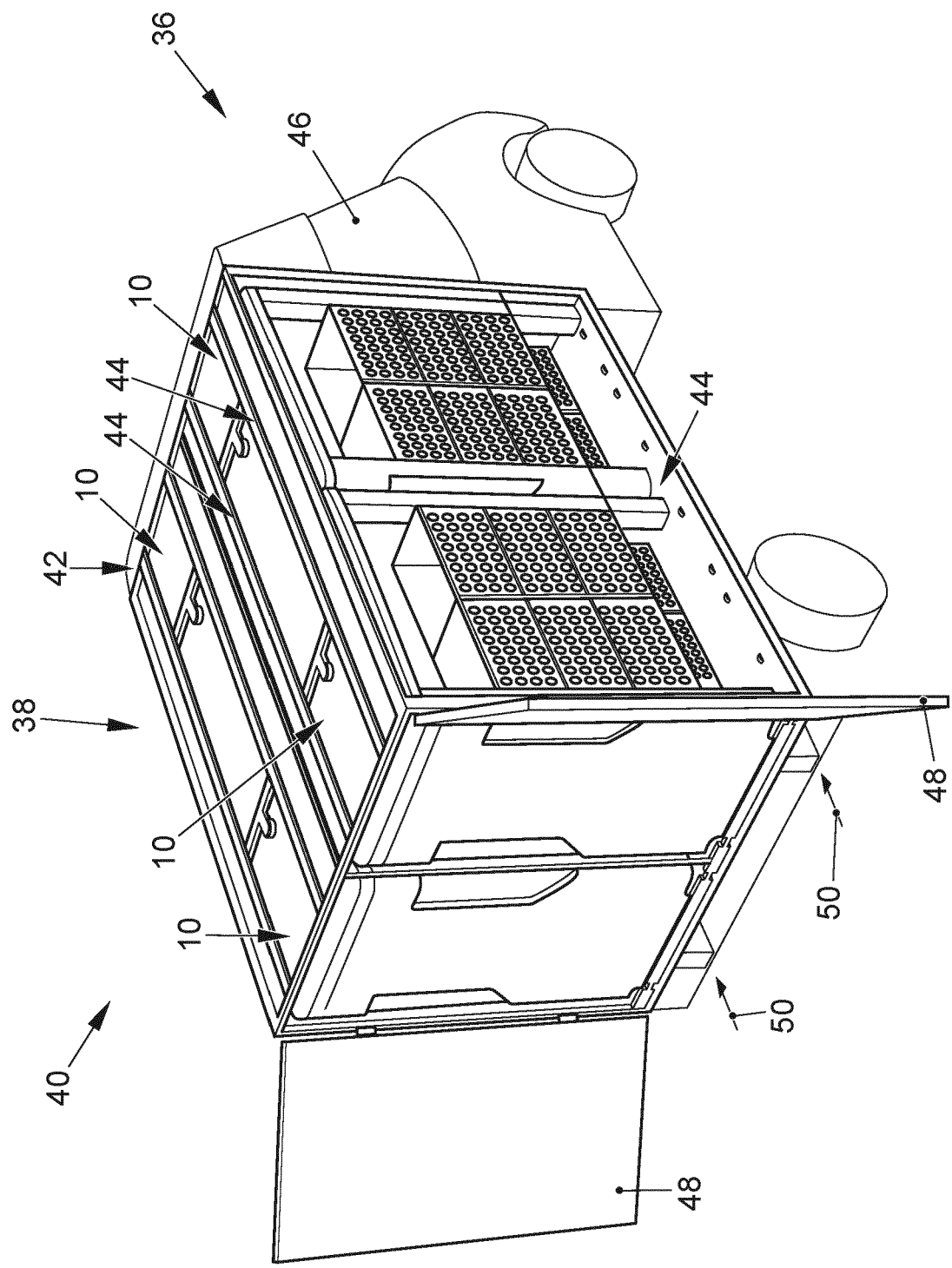
FIG. 2 is a schematic and exemplary representation of an item supply system of a logistics system arranged on a vehicle.

FIG. 2 is a schematic representation of an item supply system 38 of a logistics system 40 arranged on a vehicle 36. The item supply system 38 comprises a receiving device 42, which may also be referred to as a box body as defined within logistics jargon. Parts of the receiving device 42 are shown with transparent walls in order to show the four transport devices 10 shown inside. The four transport devices 10 almost completely fill the spatial volume of the receiving device 42, wherein components of a thermal management device 44 may be seen both at the top and at the bottom. The thermal management device 44 is presented in greater detail in FIG. 3. The receiving device 42 is arranged behind a driver's cab 46 of the vehicle 36 and almost entirely occupies said region. In other words, the receiving device 42 is arranged on a chassis (not shown here). The receiving device 42 has a height that substantially corresponds to a maximum height of the driver's cab 46. In a variant not shown here, the height may also at least partially protrude above the driver's cab 46 or above same along the entire width. A width of the receiving device 42 is provided based on a width of the driver's cab 46 or shown in this way. Deviations from the dimensions shown are conceivable, wherein smaller and also larger dimensions are conceivable. The receiving device 42 is shown having two swing doors 48 on the opposite side to the driver's cab 46, i.e. on the rear side of the vehicle 36, wherein said two swing doors 48 are shown in the opened state and also shown to be solid as opposed to transparent like the others walls. Two arrows 50 indicate a loading direction of the four transport devices 10. As such, according to the exemplary embodiment shown, rear loading of the vehicle 36 is possible in a convenient and simple manner. For example, four transport devices 10 may be placed in in order to utilize the loading space to a high degree. The receiving device 42 may be designed in the manner of a box body.

Figure 3:
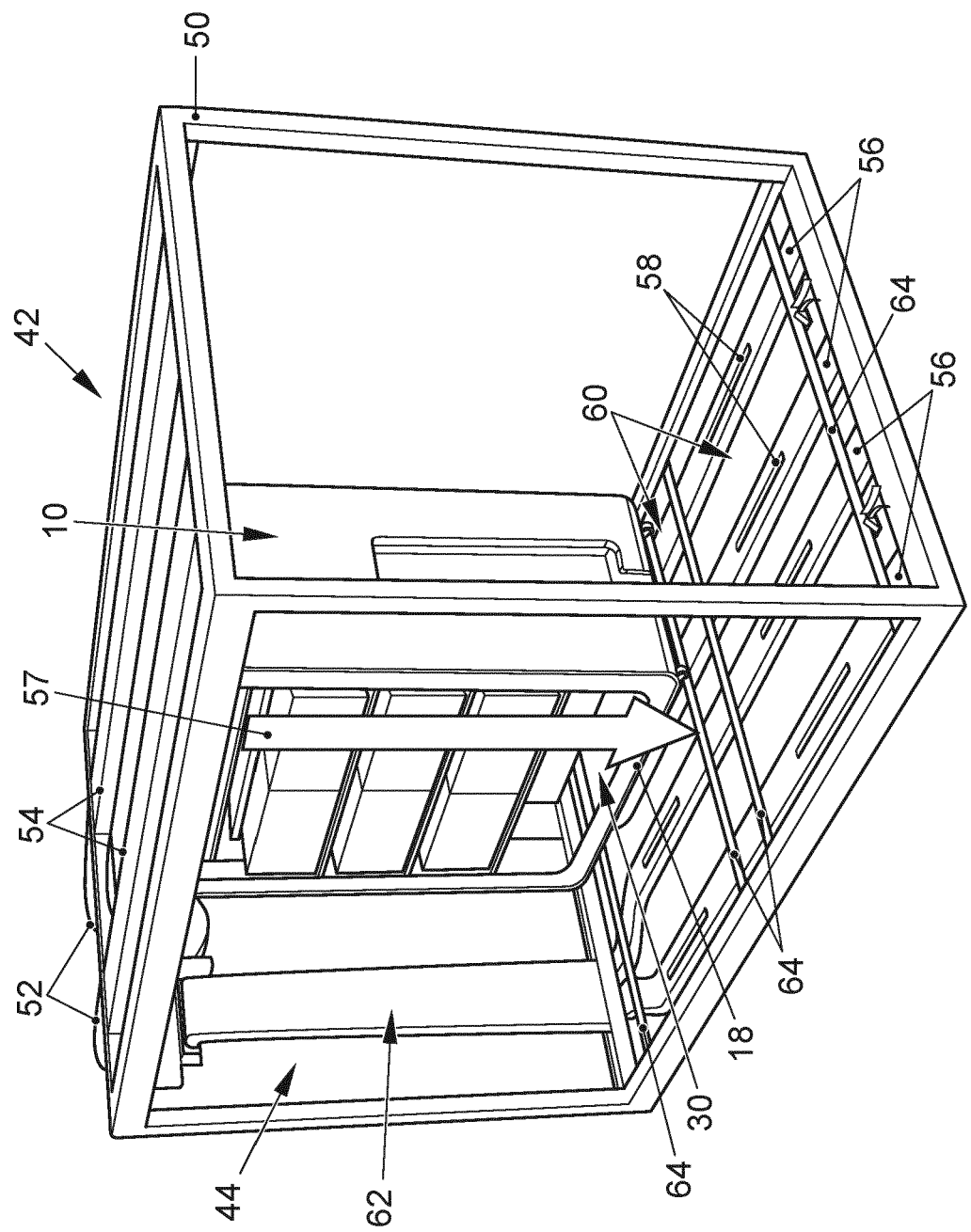
FIG. 3 is a schematic and exemplary representation of a receiving device without the outer shell, with a thermal management device and with a transport device arranged in said receiving device.

FIG. 3 is a schematic representation of a receiving device 42 without the outer shell, with a thermal management device 44 and with a transport device 10 arranged in said receiving device. It is a perspective view in which the inside of the receiving device 42 is visible. Here, only a frame 50 of the receiving device 42 consisting of substantially rectangular profiles is shown. Insulating wall elements may for example then be arranged on said frame 50, for example by means of additional fastening elements. Said frame 50 could thus also facilitate a sort of modular principle, such that a wide variety of wall elements with or without or with an only partially insulating layer may be provided depending on need. The thermal management device 44 comprises two interfaces 52 in the rear upper region (relative to the image plane) that are designed to connect the thermal management device 44 to an external thermal management device (not shown here), such that the thermal management device 44 may be operated by means of the external management device.

Proceeding from the two interfaces 52, two substantially parallel and substantially rectangular air supply ducts 54 extend in the upper region of the frame 50 of the receiving device 42, in which air supply ducts cooled or heat air, for example, may be conveyed from the external thermal management device into the interior of the receiving device 42. The transport device 10 shown is arranged accordingly on one of the air supply ducts 54 or connected thereto via a suitable assigned interface (not shown), such that cooled or heated air may be conveyed into the interior of the transport device 10 in order to cool or heat the items stored inside the transport device 10 or to control the temperature of said items in a generally user-defined manner. A flow arrow 57 indicates the course of the air flowing in. In this connection, air, for example, is guided into the transport device 10 via the air supply ducts 54 so as to then leave the transport device 10 again in the base region thereof or via a recessed region 30 in the base element 18 of the transport device 10. Four exhaust air ducts 56 of the thermal management device 44 are shown below the transport device 10, which exhaust air ducts are oriented substantially in parallel and in the longitudinal direction of the receiving device 42 and in the base region of said receiving device 42. Respective ventilation slots 58 are arranged on the side facing the base element 18 of the transport device 10, wherein two ventilation slots 58 are provided per stowing space region 60 for a relevant transport device 10. The air arriving at these ventilation slots 58 from above, indicated by the flow arrow 57, may then be sucked away via said slots so as to then be conveyed in the rear region of the receiving device 42 via respective removal duct elements 62 to the interfaces 52. Two exhaust air ducts 56 are in each case merged to form a relevant removal duct element 62, such that said exhaust air flows are combined by means of the relevant removal duct element 62. Subsequently, the air may be guided via the interfaces 52 to the external thermal management device (not shown here) such that the cycle of ventilation or user-defined temperature control is complete and may start again. In addition, four latching strip elements 64 are shown arranged on the exhaust air ducts 56, which latching strip elements are arranged substantially at a right angle to the exhaust air ducts 56 and extend over almost the entire width of the receiving device 42. By means of said latching strip elements 64, the rollers 34 of a relevant transport device 10 may be fixed or engaged, such that the respective transport devices 10 remain securely anchored at a location or a position for transportation in the receiving device 42.

Figure 4:
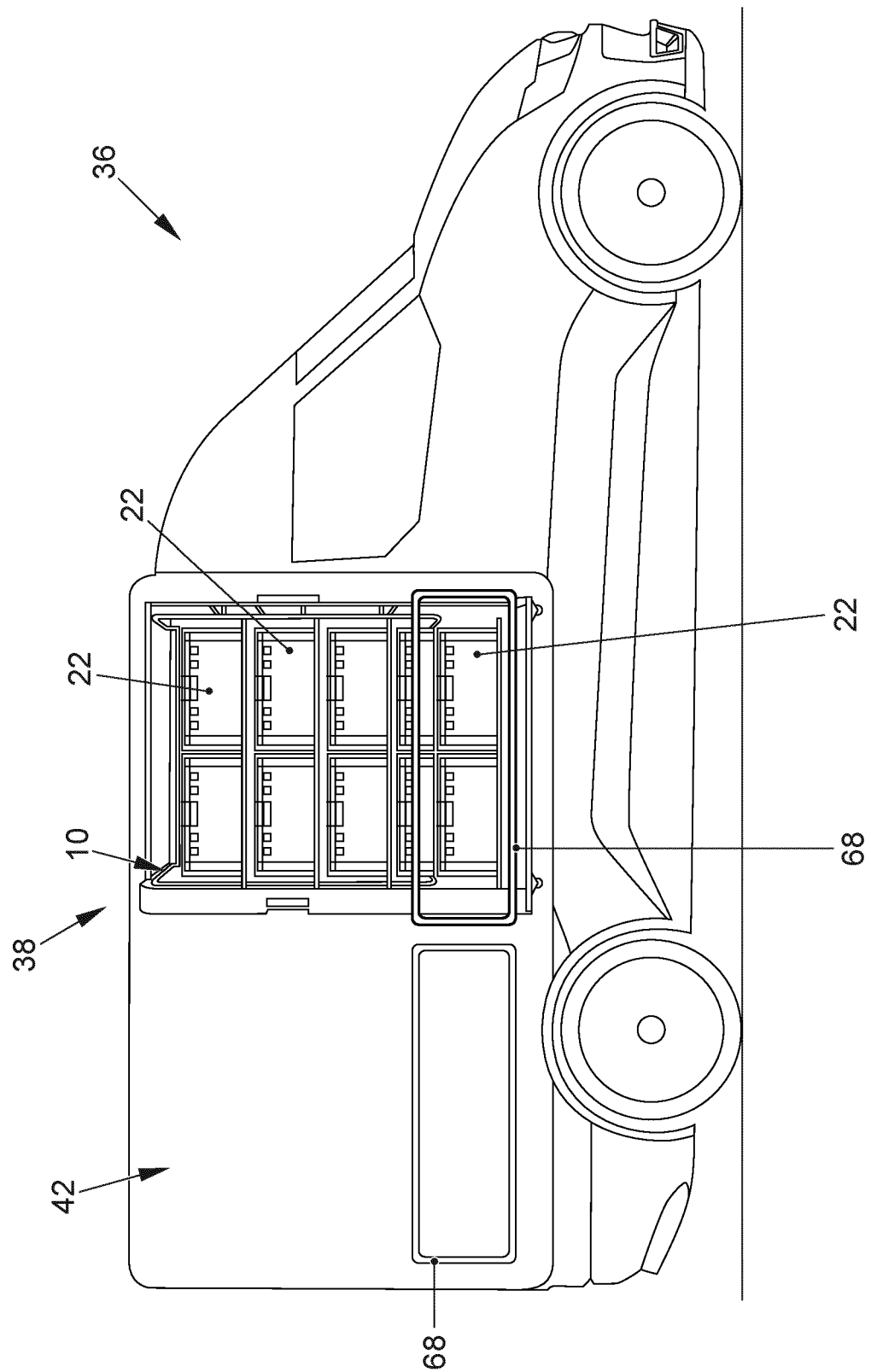
FIG. 4 is a schematic and exemplary representation of a vehicle with a receiving device arranged thereon.

FIG. 4 is a schematic representation of a vehicle 36 with a receiving device 42 arranged thereon. The receiving device 42 is part of an item supply system 38 of a logistics system 40. Viewed relative to the image plane, the left-hand side of the receiving device 42 is shown having an insulating wall, wherein a cargo hatch 68 is shown in the lower region. Said cargo hatch 68 is shown to be substantially rectangular with rounded corners and is used for removing items from inside the receiving device 42. In other words, the cargo hatch 68 may be opened from the outside in order to then enable access to a relevant transport device 10 inside the receiving device 42. For example, access may be guaranteed to an item storage unit 22 that is provided at a particular position in the relevant transport device 10. For example, a desired item in a particular item storage unit 22 may be moved to the position of the cargo hatch 68 in the relevant transport device 10 such that customer-friendly removal of the item is made possible. The insulating wall is shown to be transparent on the right-hand side, viewed relative to the image plane, such that a transport device 10 stowed at this position inside the receiving device 42 is visible. The transport device stowed there comprises multiple item storage unit 22, of which four are shown in the visible region. The lowermost item storage unit 22 is designed such that access to the items in said item storage unit 22 is made possible by means of the cargo hatch 68 shown.

Figure 5:
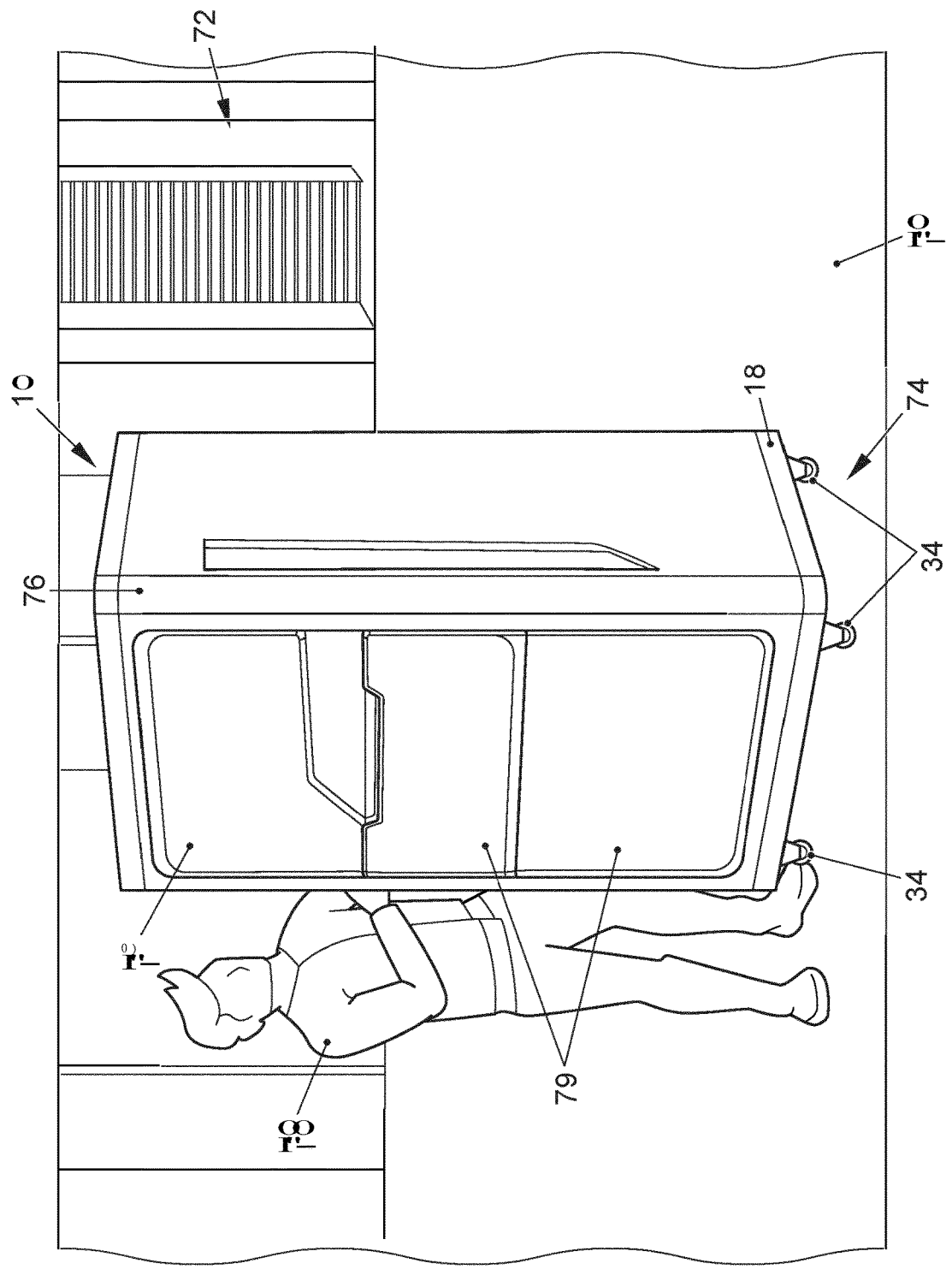
FIG. 5 is a schematic and exemplary representation of a transport device outside a receiving device.

FIG. 5 is a schematic representation of a transport device 10 outside a receiving device 42. Said transport device 10 is standing on a floor 70 of a pick-up location 72, which may for example be the entry hall of a large building or factory. The transport device 10 has four rollers 34 on the base element 18, of which only three may be seen in this perspective view. Said rollers 34 may be referred to together as a roller device 74. A roller device 74 of this kind could be designed in a different manner to that shown, wherein any means for moving the transport device 10 over a floor 70 are conceivable. By means of said rollers 34, the transport device 10 may be taken out of a receiving device 42 (not shown here) and then rolled to the pick-up location 72. In this FIG. 5, the transport device 10 comprise an at least partially closable outer shell 76. Three variants of removal hatches 78 are shown. A user 78 is standing to the side next to the transport device 10. The user 78 may access at least one removal hatch 79 and an item storage unit 22 stored there behind by means of an access device (not shown here) in order to remove an item ordered previously via the data management system (also not shown here). The access device not shown here may for example be a display element having an input mask for example in the form of a number and/or letter code to be input. A fingerprint reading unit may also be provided. However, a simple lock-key solution is also conceivable. Equally, a phonetic input unit with user voice recognition is also conceivable. In other words, the user 78 may order a desired item via the logistics system and for example via the data management system (not shown)

and then remove said item from the item storage unit 22 provided therefor after order picking from the stowed transport device.

Figure 6:
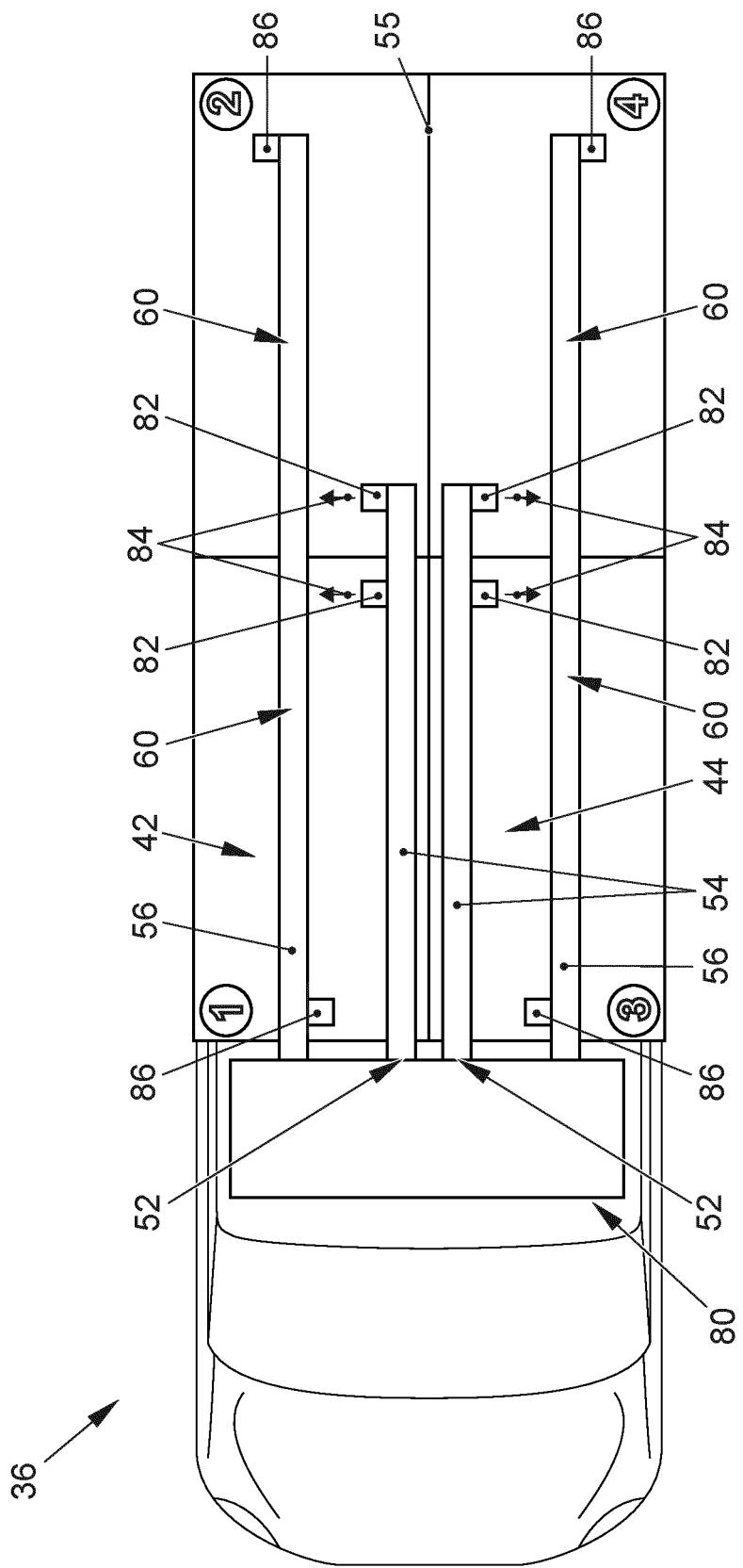
FIG. 6 is a schematic and exemplary representation in plan view of a vehicle with a receiving device arranged thereon with a first variant of a thermal management device.

FIG. 6 is a schematic representation in plan view of a vehicle with a receiving device 42 arranged thereon with a first variant of a thermal management device 44. The thermal management device 44 is connected to an external thermal management device 80, wherein this is done via two interfaces 52. The external thermal management device 80 is part of the vehicle 36 and provided on a roof region of a driver's cab (shown here) of the vehicle 36. However, it is also conceivable for the external thermal management device 80 to function and be provided independently of the vehicle 36 as a separate unit. The external thermal management device 80 may for example produce warm or cold air, which is then fed into the thermal management device 44 accordingly. The thermal management device 44 is with two air supply ducts 54, which extend from the interfaces 52 approximately halfway along the upper long side of the receiving device 42. The two air supply ducts 54 extend (relative to the image plane) above and below an unperforated central partition 55. In a variant not shown here, said partition may only be present in part or not at all. On account of the partition, the temperature may be controlled differently and precisely in individual regions as defined by the user. Respective ventilation nozzles 82 out of which air flows, as indicated by the flow arrow symbols 84, may be seen in the four shown and numbered stowing space regions 60 of the respective transport devices 10 (not shown). In other words, it is possible in this variant to control the temperature of the respective stowing space regions 60 and thus of the transport devices 10 stowed there individually and in a user-defined manner. For this purpose, the ventilation nozzles 82 shown may comprise control mechanisms (not shown here), which controls or regulates said distribution process of the hot or cold air. Two substantially parallel exhaust air ducts 56 may be seen in the base region of the receiving device 42, via which ducts the temperature-controlled air fed in may be sucked away again and fed to the external thermal management device 80. For this purpose, the exhaust air ducts 56 comprise respective suction nozzles 86, which are provided in the front and rear region.

Figure 7:
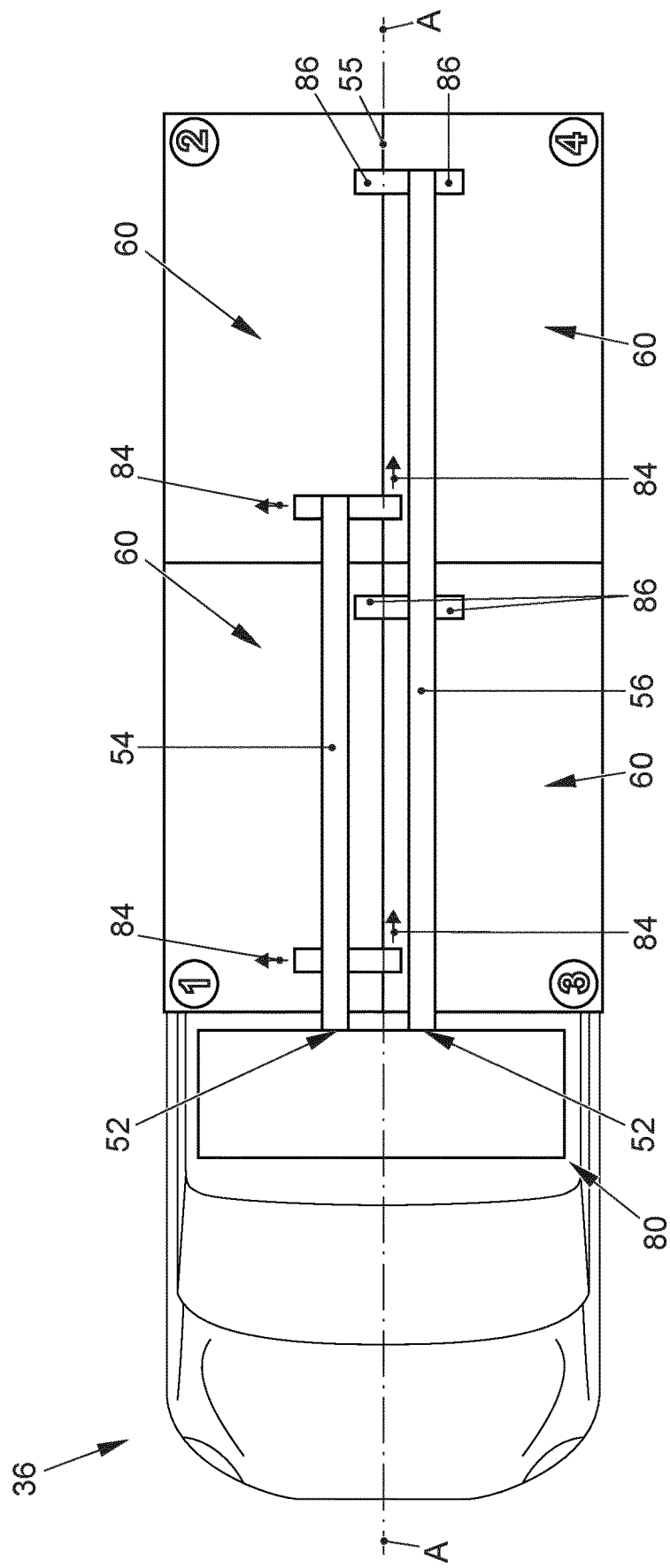
FIG. 7 is a schematic and exemplary representation in plan view of a vehicle with a receiving device arranged thereon with a second variant of a thermal management device.

FIG. 7 is a schematic representation in plan view of a vehicle 36 with a receiving device 42 arranged thereon with a second variant of a thermal management device 44. In this second variant, only one air supply duct 54 and one exhaust air duct 56 are provided, which are connected to an external thermal management device 80 via respective interfaces 52. The air supply duct 54 again extends roughly to the center of a longitudinal direction of the receiving device 42 and in the upper region of the receiving device 42. This time, the ventilation nozzles 82 are arranged substantially at a right angle so as to protrude from both sides of the air supply duct 54. Two opposing ventilation nozzles 82 are arranged a short distance behind the interface 52, wherein one ventilation nozzle 82 is longer than the opposing ventilation nozzle 82. The same arrangement is provided at the end of the air supply duct 54, wherein one ventilation nozzle 82 is this case also longer than the opposing ventilation nozzle 82. Flow arrow symbols 84 indicate the path of the outflowing air. The longer ventilation nozzles 82 guide the air substantially in parallel with a longitudinal direction of the receiving unit 42. In contrast, the shorter ventilation nozzles 82 guide the air into the interior of the receiving unit 42 at a right angle to a longitudinal side of the air supply duct 54. The course of the air supply duct 54 is laterally offset somewhat with respect to a center liner AA of the receiving unit 42, wherein said air supply duct 54 is provided above said center line AA, viewed relative to the image plane. The center line AA also lies along an unperforated center partition 55 shown here. Said partition may only be partially provided or not provided at all in a variant not shown here. In contrast, the exhaust air duct 56 is provided below said center line AA and extends in the base region of the receiving device 42 and over almost the entire length of the receiving device 42. Respective suction nozzles 86 that are shown to be arranged substantially at a right angle to the exhaust air duct 56 and directly thereon may be seen approximately in the center and at the rear end of the receiving device 42, i.e. to the right relative to the image plane. Opposing suction nozzles 86 are shown to be almost the same length. In variants not shown here, the components of the thermal management device 44 presented above may be adapted in any desired manner to a corresponding application scenario, for example to a specific design of a variant of a transport device 10 also not shown here. Equally, all components of the logistics system 40 may interact with one another and/or be interconnected via a data management system not shown here. This may for example be done at least partially via the interfaces (not shown here) between the receiving device 42 and the transport devices 10 and also wirelessly, wherein respective transceiver units or respective individual transmission units and receiver units may be provided in this case. In this way, the temperature of the numbered stowing space regions 60 shown may be controlled as defined by the user, wherein the data management system may for example be operated from the driver's cab 46 via an input device. Furthermore, said data management system may for example utilize information from a navigation device and thus generate a special piece of information of the sales order. For example, the time at which items are handed over may be determined to be in approximately 10 minutes' time depending on said piece of information. The temperature of an item to be delivered may thus be controlled as defined by the user such that a desired condition may be produced upon handover of the item. As such, this concept only provides for one air supply line and one exhaust air line that extend through the central partition 55. The benefit of thus is a smaller overall length of the system and thus a lower weight. It is also possible to connect just two ducts to the cooling unit and to design said ducts in a less complex manner. However, the fact of the central partition 55 being perforated four times could be disadvantageous, however this disadvantage could in turn be beneficially compensated by controlling the individual air flows in a targeted manner. Furthermore, the central partition 55 could be sealed accordingly at the points of perforation in a manner not specified here.

Figure 8:
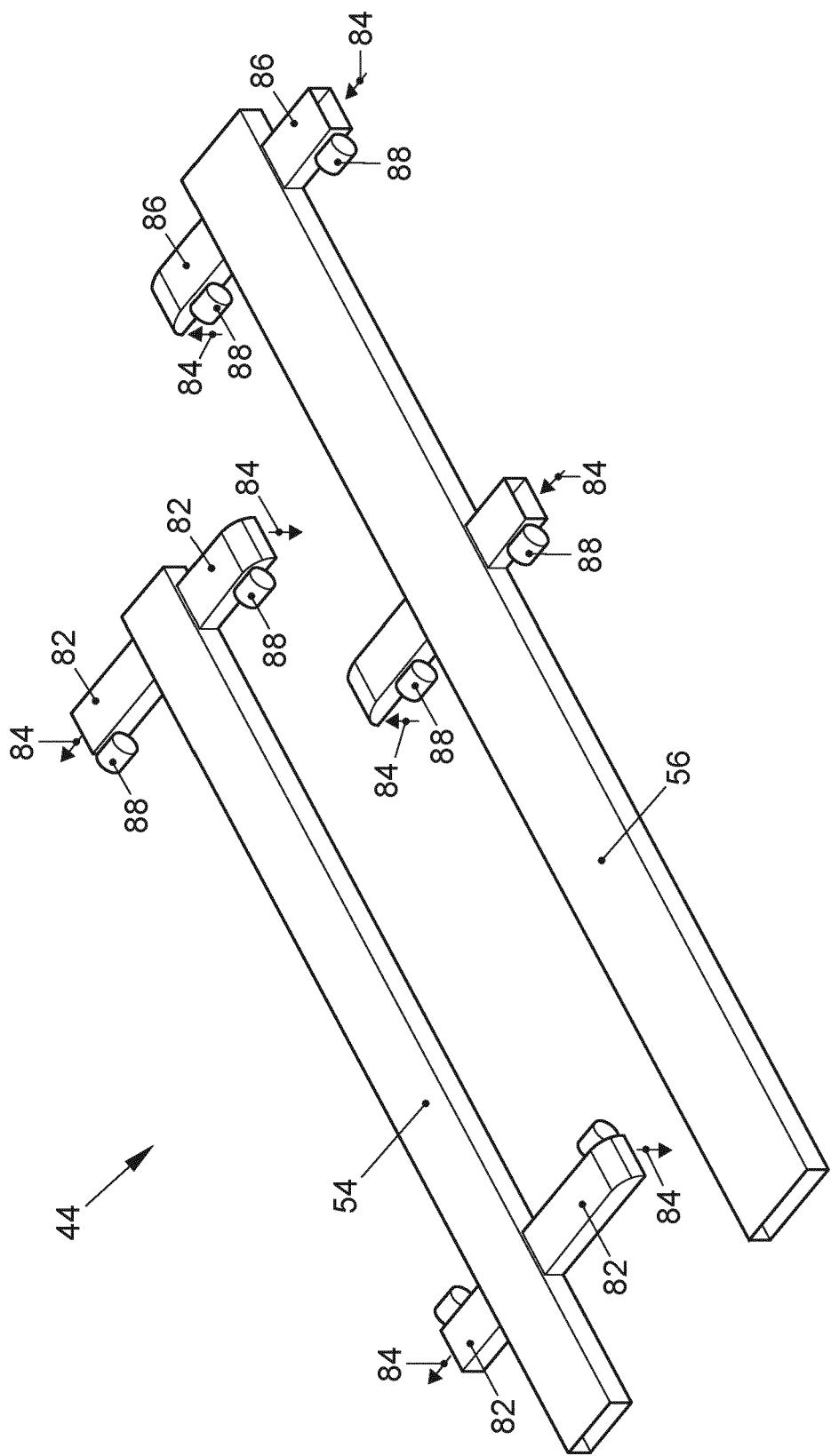
FIG. 8 is a close-up schematic and exemplary representation of a thermal management device.

FIG. 8 is a close-up schematic representation of a thermal management device 44. An air supply duct 54 and an exhaust air duct 56 are also shown. Said two ducts 54, 56, which may also be referred to in each case as the main duct, are shown to be substantially rectangular, flattened hollow profiles. It is conceivable for the cross-sections produced to be adaptable to a volumetric flow rate of through-flowing air or to be set in advance for the relevant application scenario. In addition to the relevant main duct in the center, respective ventilation nozzles 82 of the like shown in FIG. 7 are also shown with the air supply duct 54 and respective suction nozzles 86 of the like shown in FIG. 7 are also shown with the exhaust air duct 56. Respective flow arrow symbols 84 show the course of the air as shown in FIG. 7. Respective control valves 88 that may control an outgoing volumetric flow rate may be seen on the ventilation nozzles 82, wherein, as with almost all components presented above, said control valves 88 are designed to be controllable directly or indirectly by means of the data management system (not shown here). The control valves 88 may for example be actuated electrically and/or pneumatically and they may be directly and/or indirectly connected to the data management system so as to be controllable. In this regard, any established control systems may be at least partially used or integrated. Control valves 88 of this kind are also shown on the respective suction nozzles 86 and these are similarly designed to be operable. In order to prevent particles from being sucked into the cooling system or thermal management device 44, for example in the region of the exhaust air lines, i.e. exhaust air ducts 56, the flow speed must not be too high. By contrast, the installation space required for arrangement of the ducts below the ceiling of a receiving device 42 is not limited, such that a larger cross-section, unlike in other concepts, does not lead to problems with regard to the insulation or strength of the receiving device 42, which is for example designed as a box body as defined within the logistics industry. As such, middle ground may be found with regard to the dimensions, such that little noise pollution and yet good circulation of the air inside the cooling cells may be achieved with an adapted volumetric flow rate. A flow speed of 25 m/s generates a noise level of 56 dB with the line cross-section of 0.2×0.04 m provided, which, for ease of classification, is comparable to the noise levels emitted by a sewing machine. As a result, a volumetric flow rate of 750 m$^3$/h is possible. This is merely an exemplary design and other dimensions are also conceivable.

Figure 9B:
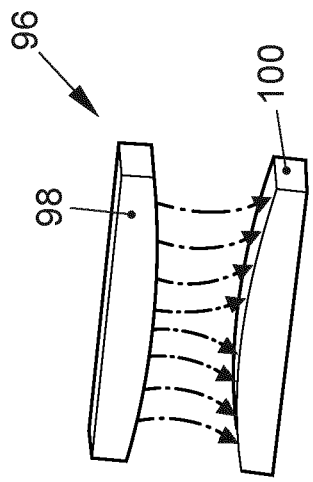
FIG. 9b is a schematic and exemplary representation of a second connection concept between respective interfaces of a transport device and a receiving device.
Figure 9A:
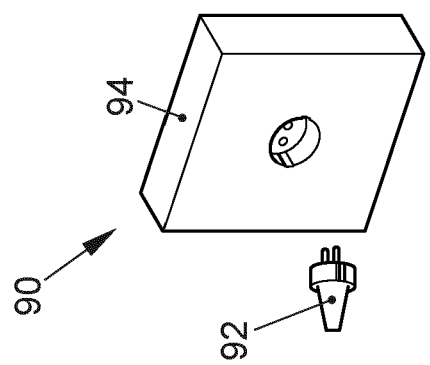
FIG. 9a is a schematic and exemplary representation of a first connection concept between respective interfaces of a transport device and a receiving device.

FIG. 9a is a schematic representation of a first connection concept 90 between respective interfaces of a transport device 10 and a receiving device 42. In this case, a plug element 92 and a socket element 94 are provided. The respective elements 92, 94 may accordingly be provided in any desired variants such that a connection may be established between the transport device 10 and the receiving device 42. The embodiments shown are merely exemplary and any other designs are conceivable. Generally speaking, a power supply should transmit a voltage of V with a current strength of 16 A. This is provided, for example, by a commercial vehicle. Moreover, the power supply is subjected to temperature fluctuations and moisture and must therefore be robust. In addition, it must be possible to activate said power supply in an ergonomically appropriate manner without requiring additional movement of an operator or user. These requirements also apply for the following concepts. The solution with a plug element 92 and socket element 94 offers the benefit that they may be acquired cheaply in large quantities for example as an additional purchase and thus allow for a cheap design variant. Furthermore, a defective connection may be replaced quickly. Moreover, in addition to the operating power, information lines via which data may be read out by the sensors installed in the transport device (temperature sensors, rotational speed sensors, position encoders, etc.) may also be passed through said connection.

FIG. 9b is a schematic representation of a second connection concept 96 between respective interfaces of a transport device 10 and a receiving device 42. In this case, a first induction connection element 98 is provided on the receiving device 42 and a second induction connection element 100 is provided on the transport device 10, such that contactless transmission of energy and data is made possible. The embodiments shown are merely exemplary and any other designs are conceivable. In other words, in this concept, a power supply is for example provided via resonant inductive coupling. In this case, one resonant circuit is implemented by the box body (receiving device 42) and one resonant circuit is implemented by the transport device 10. Each of said resonant circuits consists of a capacitor and a coil. Since the resonant frequency of the two coils is matched to the transmission frequency, energy may be transmitted over a short distance.

Figure 9C:
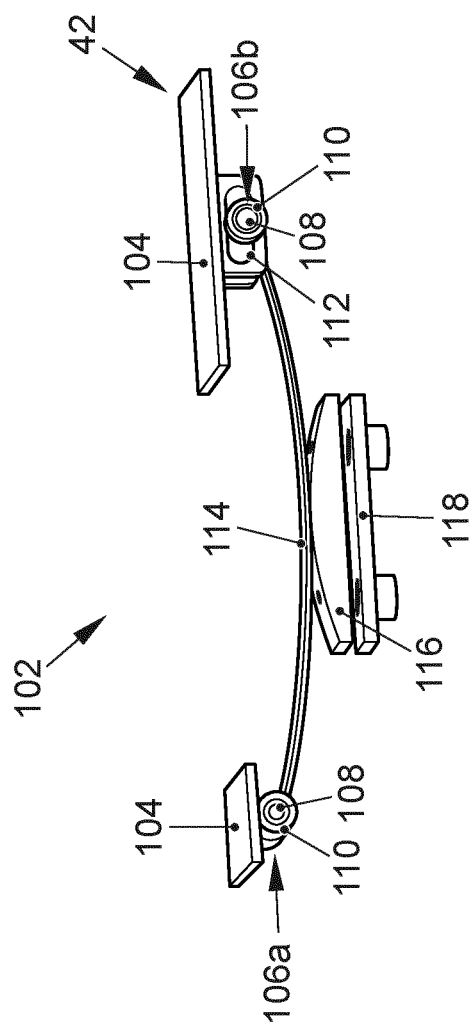
FIG. 9c is a schematic and exemplary representation of a third connection concept between respective interfaces of a transport device and a receiving device.

FIG. 9c is a schematic representation of a third connection concept 102 between respective interfaces of a transport device 10 and a receiving device 42.

Details of wall regions 104 of the receiving device 42 are shown here. The wall regions 104 could also be referred to as the top. Respective receiving devices 106a, b for receiving plug connection elements 108 by means of securing elements 110 may be seen on each of said wall regions 104, wherein the receiving device 106b is designed having a slot element 112. A resilient element 114 may be clamped between said receiving devices 106a, b and the respective plug connection elements 108, wherein the preload may be varied by means of the functionality of the slot element 112. The resilient element 114 is convexly curved downward in relation to the image plane. An interface element 116 that is assigned to a transport device 10 such that a connection may be established between the transport device 10 and the receiving device 42 is arranged at the vertex. Said interface element 116 may for example be designed as a current collector that functionally interacts with the resilient element 114. A support element 118 that accordingly secures the interface element 116 on the transport device 10 is shown below the interface element 116. As a result, a transport device 10 may be positioned in the receiving device such that a reliable connection between the two components may be produced by means of the concept presented above. The resilient element 114 thereby ensures convenient handling, since a certain amount of clearance is provided regardless of an exact initial orientation of the transport device 10. The resilient element 114 may for example be constructed from two leaf springs. The first and second interface element 116, 118 may for example be constructed in the manner of current collectors. As such, the transport device 10 may be pushed into the receiving device 42 and has a direct power supply after placement. This solution has the benefit that low manufacturing tolerances, which may occur, for example, in the case of a box body (receiving device 42) and the transport device 10, are compensated. It may therefore be considered as a simple and robust solution. A power supply may for example be designed such that the current collector (interface element 116) is directly screwed to a lining of the transport device 10. From there, motors of a movement device, for example, are supplied with power via the cable screwed to the collector. Receiving means may be glued to the ceiling of the box body (receiving device 42). The resilient element 114, for example in the form of a leaf spring, is accordingly screwed thereto and comprises a rigid device on one side for secure mounting and a flexible device on the other side via the slot element 112. This is required, since, by design, the leaf spring must lengthen upon contacting the current collector. The leaf springs are supplied with a voltage of, for example, 48 V by means of current-carrying cables. Said cables extend, for example, through the cooling ducts (ducts 54, 56) of the box body. In order for only 50% of the cables to be required, the ground is taken directly from the cooling duct of the box body, which is connected to the bodywork and is constructed at least in part from a corresponding material. The cables are screwed to the leaf spring on the rigid mounting side. If the transport device 10 is pushed into the refrigerated box body, the leaf springs are moved in the positive z direction and lengthen in the positive z direction. As a result, the transport device 10 is supplied with power immediately after being pushed in. A contact pressure is exerted on the current collectors via the leaf springs. This is required, since the transport device 10, during the transportation process in the receiving device 42, which is arranged on a vehicle 36, is subjected to dynamic forces in the x, y and z direction. The contact pressure of the leaf springs compensates for said dynamic changes in length and ensures a permanent power supply. As a result, this solution provides the required process reliability. A light signal generated by means of a light-emitting diode or comparable apparatus or an sound signal generated by a buzzer confirms the existence of the power connection.

Figure 10:
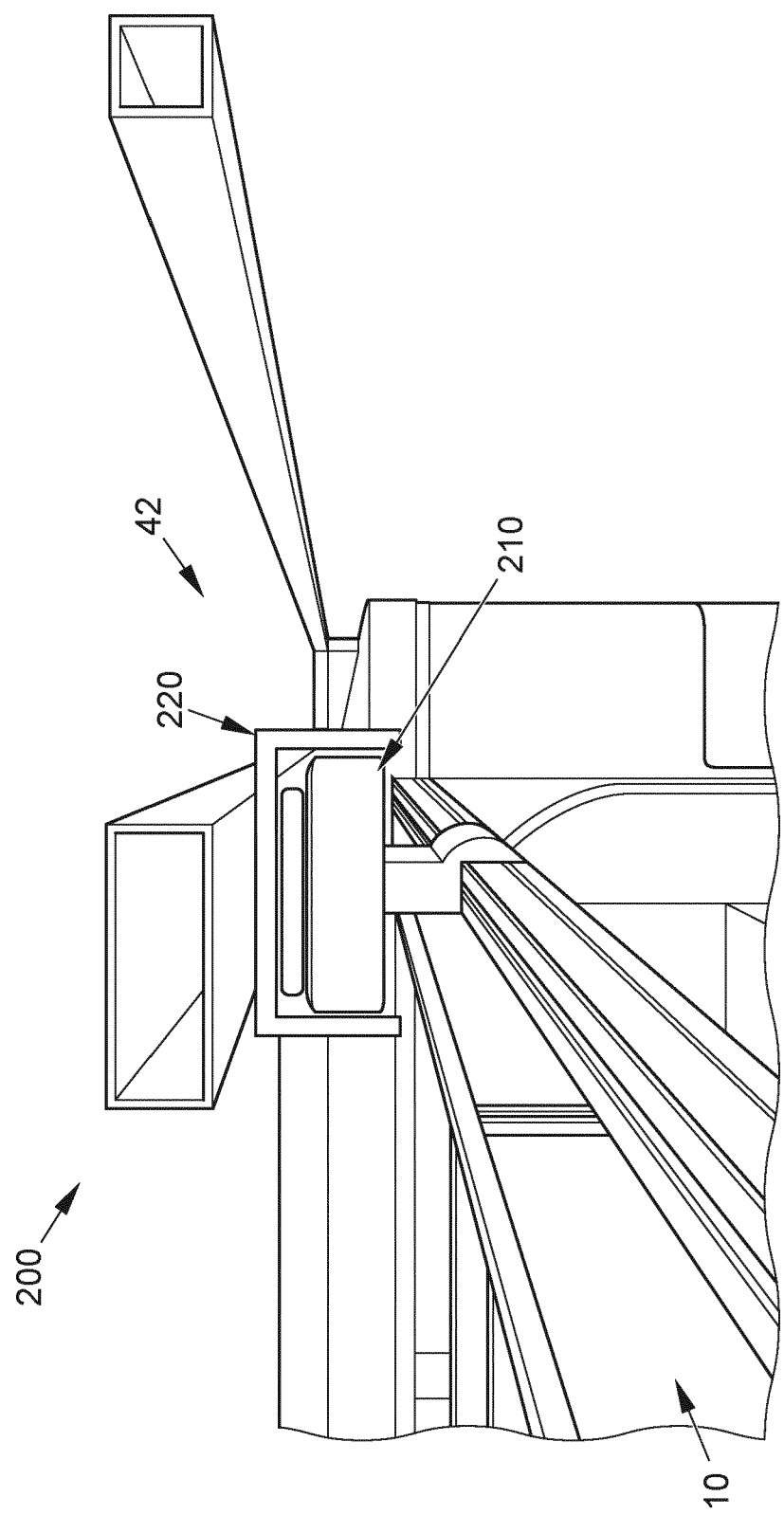
FIG. 10 is a schematic and exemplary representation of a fourth connection concept between respective interfaces of a transport device and a receiving device.

FIG. 10 is a schematic representation of a fourth connection concept 200 between respective interfaces of a transport device and a receiving device 42. A contact head 210, which is arranged on the transport device 10 is inserted into a rail guide device 220, which is arranged on the receiving device 42, such that power may be transmitted between the transport device and a receiving device 42. The system is thus slightly reminiscent of power supplies for trams with an overhead line. The power cables are laid over the box body (receiving device 42) and for example over the roof beams, such that the power may ultimately be transmitted via the contact head 210 located on the transport device 10. Said contact system is also used to correctly position and secure the transport device 10. Subsequently, the power at the contact head 210 may be conducted via lines in the transport device to the individual components, for example an electric motor of the movement device 20 or various movement sensors or temperature sensors. Said components (not shown here), for example the movement sensors and temperature sensors, may be arranged in the transport device 10 such that they accordingly determine current information relating to the condition of items stored in the respective item storage units 22, which may for example be provided in the form of crates made of plastics material, and provide said information to the higher-level data management system 120, which is connected to said components.

Figure 11:
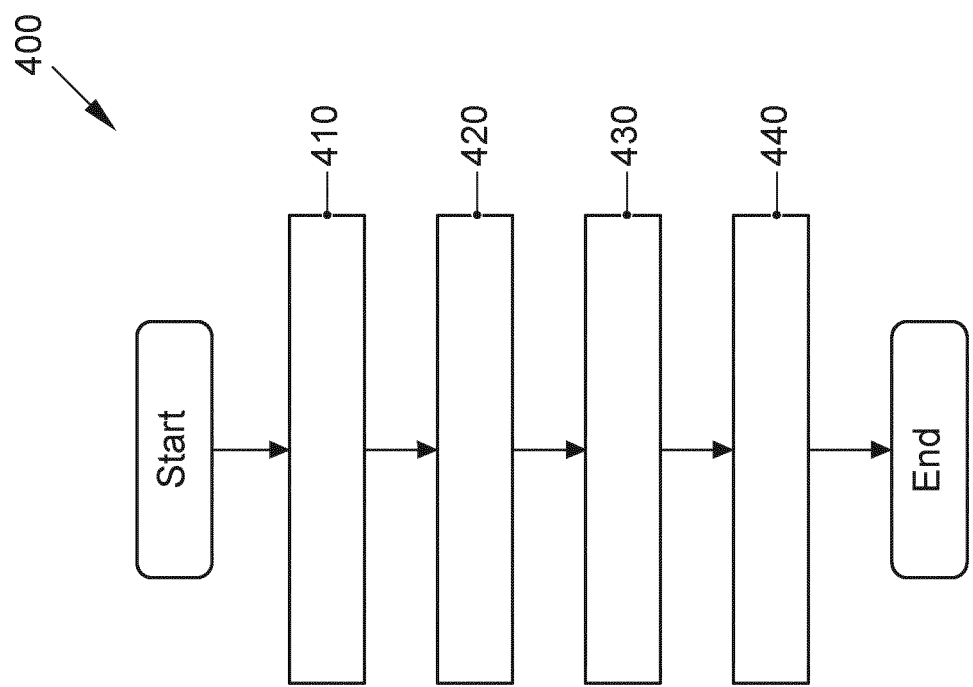
FIG. 11 is a process flow diagram of a method for operating a logistics system according to embodiments of the invention.

FIG. 11 is a process flow diagram 400 of a method for operating a logistics system 40 according to claims 1 to 13. In a first step 410, at least one item is supplied in at least one position in an item supply system 38. In a second step 420, the at least one item is linked with at least one piece of information from at least one sales order by means of a data management system 120. In a third step 430, it is checked by means of the data management system 120 whether the at least one piece of information from the at least one sales order has been changed. In a fourth step 440, the at least one position of the at least one item in the item supply system 38 is changed automatically depending on the at least one piece of information from the at least one sales order.

Figure 12:
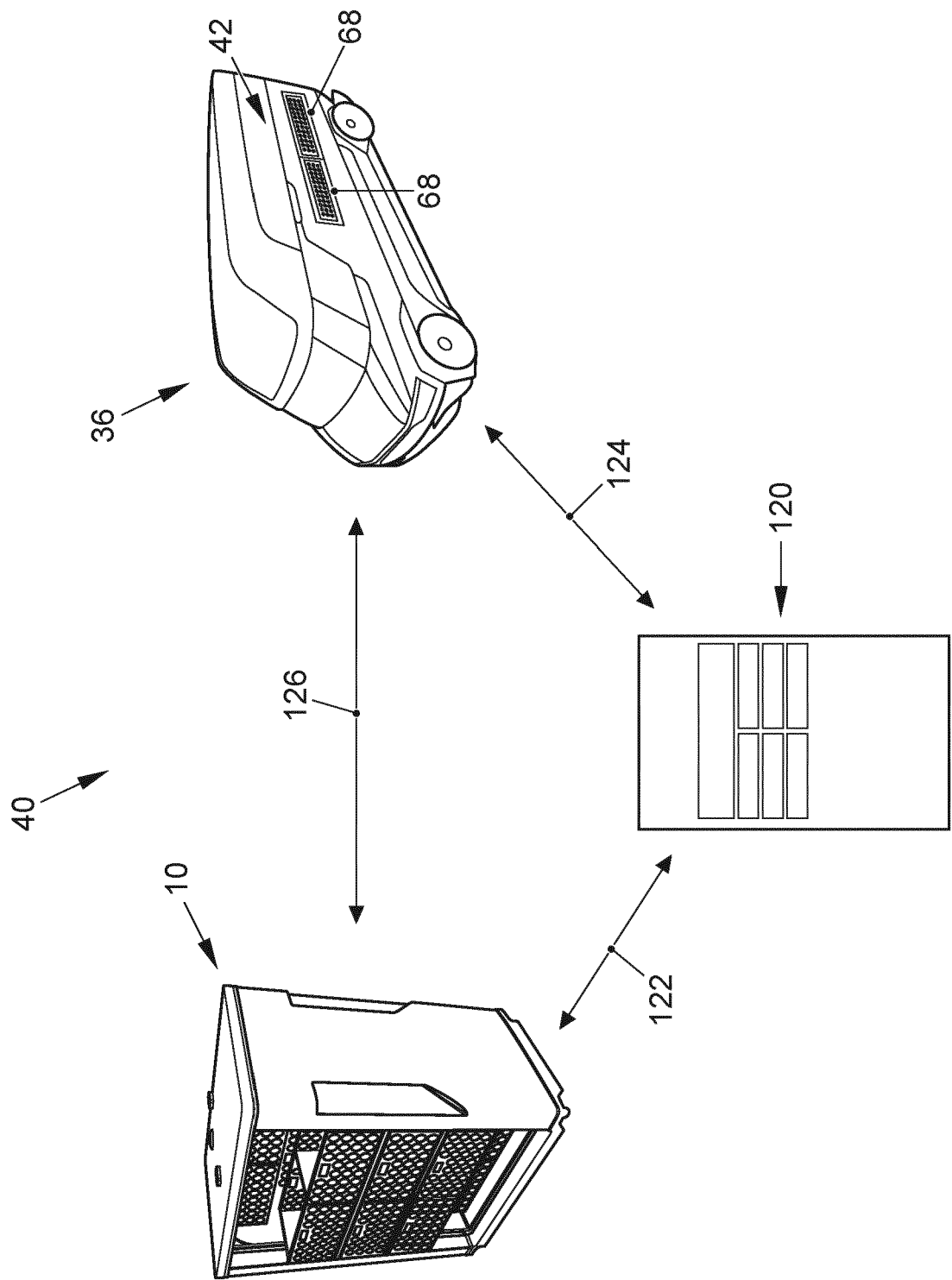
FIG. 12 is a schematic and exemplary representation of components of a logistics system.

FIG. 12 is a schematic representation of components of a logistics system 40. Firstly, a transport device 10 of the like explained in more detail with reference to FIG. 1 is shown.

Secondly, a data management system 120 is shown represented in the form of a display. Ultimately, the data management system 120 is a piece of software that is for example operated exclusively or only partially on an external server, wherein the server is at least part of the data management system 120. However, it is also conceivable for only the program itself to be present on the server and respective elements to be processed to be stored in the form of various data or databases at the respective components of the logistics system 40. A first block arrow 122 indicates the extent to which, for example, the transport device 10 interacts with the data management system 120 and the extent to which a functional relationship ultimately exists here. Additionally, a vehicle 36 is shown, wherein a second and third block arrow 124, 126 each indicate the interaction with the transport device 10 and the data management system 120. A receiving device 42 of the like described in more detail with reference to FIG. 3 may be seen on the vehicle 36. However, in this FIG. 12, the receiving device 42 is shown with solid and thus opaque walls. It is also conceivable for the receiving device 42 itself to have been integrated in said vehicle 36 in such a way that an original box body or cargo space is maintained and only the lateral cargo hatches 68 were adapted. In this case, the receiving device 42 should be understood according to a sort of modular principle, wherein individual components are integrated into an existing architecture of the vehicle having been adapted accordingly to a relevant case. It is conceivable, for example, for only the chassis 50 from FIG. 3 to be provided together with the thermal management device 44 and for an already present box body with adapted cargo hatches 68 to provide the insulting side walls and roof sections. As such, the logistics system 40 presented should generally be understood as a sort of modular system that may be adapted in any desired manner in order to facilitate or even ensure customer-friendly and efficient delivery of items.

Figure 13:
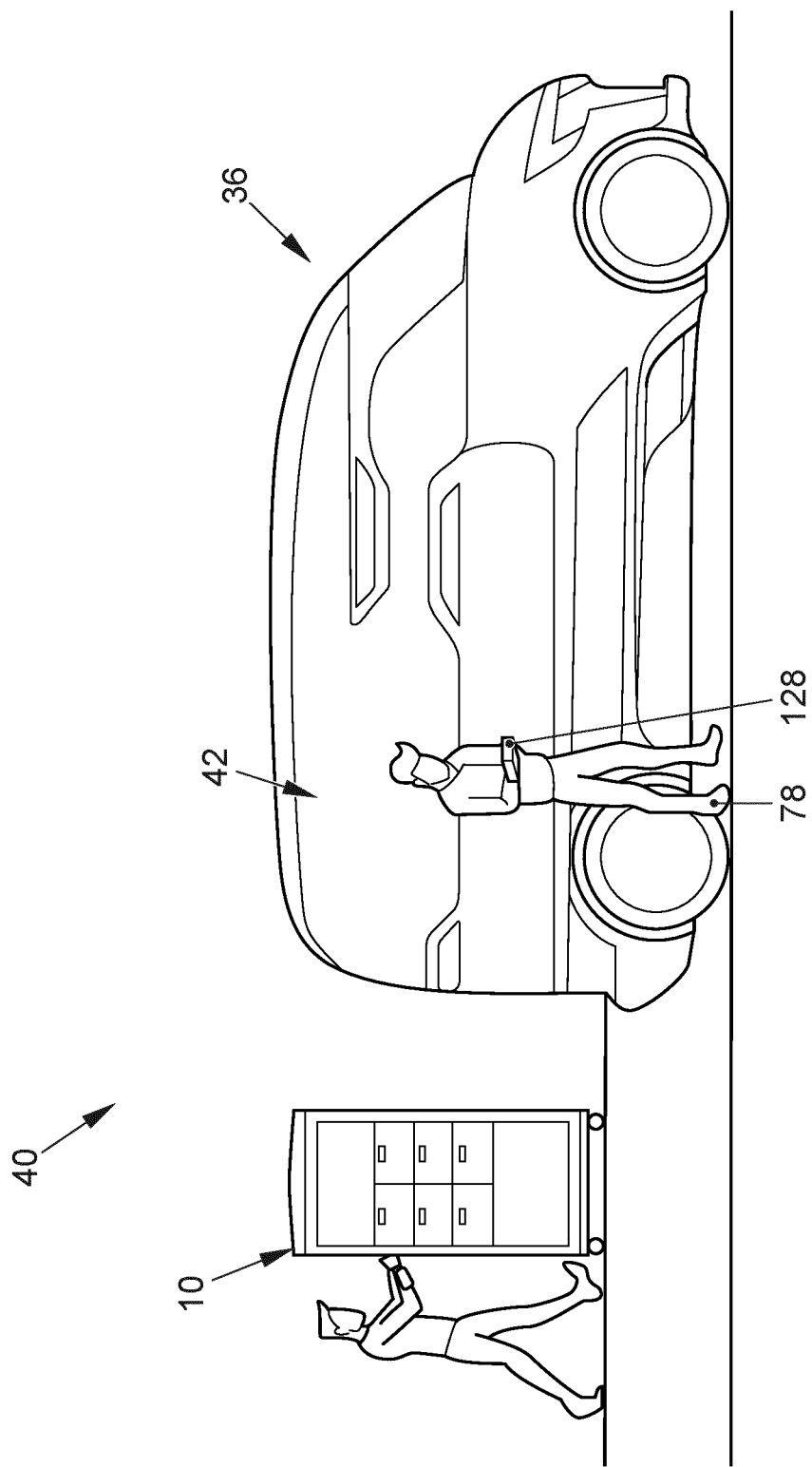
FIG. 13 is another schematic and exemplary representation of components of a logistics system.

FIG. 13 is another schematic representation of components of a logistics system 40. The vehicle 36 again comprises an integrated receiving device 42. A transport device 10 is currently being rolled into said receiving device 42. A user 78 is holding in their hands a mobile end device 128, which may display parts of the data management system 120 (not shown in this case) or may comprise same integrated in its memory. In other words, the user 78 may use the mobile end device 128 to operate the data management system 120 itself or at least parts thereof, such that, for example, an available piece of information from a sales order or a complete dataset from said sales order are visibly displayed. Furthermore, the thermal management device 44 or the movement device 20 in the transport device 10, for example, could be controlled directly or indirectly via the mobile end device 128. It is also conceivable for only one desired item to be put into a desired condition or for said request to be formulated, wherein an ideal position in a particular item storage unit 22 is then determined and displayed by means of the data management system 120. The item may also be placed in the item supply system 38, wherein a desired condition, for example a particular temperature at which the item should be when it arrives at the destination is selected and said condition is achieved accordingly by means of the individual components of the logistics system 40. For example, a travel time calculated via a navigation instrument is incorporated in order to accordingly adjust the thermal management system 44. The movement device 20 may then for example move the item into an ideal position at which a particular temperature prevails, such that the desired condition is achieved at the destination itself. If the vehicle 36 is in a traffic jam, for example, this state may also be taken into account accordingly and a user-defined condition of the item may be achieved by means of the data management system 120 or due to the interaction between all components of the logistics system 40.

Figure 14:
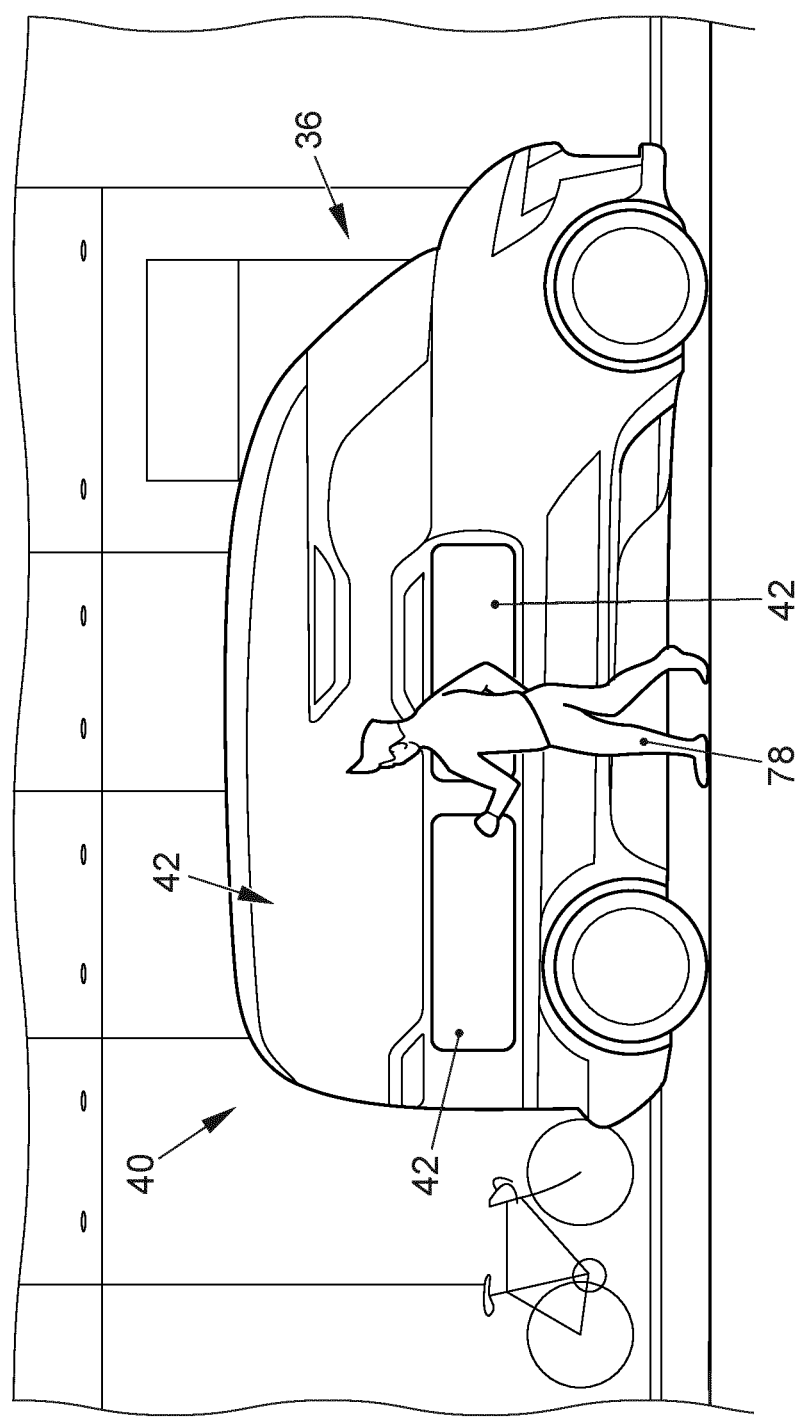
FIG. 14 is another schematic and exemplary representation of components of a logistics system.

FIG. 14 is another schematic representation of components of a logistics system 40. The parked vehicle 36 again comprises an integrated receiving device 42. A user 78 is standing in front of two cargo hatches 68 and is for example operating an opening device (not shown) in order to remove an item. The two cargo hatches 68 provide suitable small unloading cross-sections such that respective item storage units 22 may be reached. In one variant (not shown here), it may be possible to said cargo hatches 68 to be subdivided further, such that only one item storage unit 22 is accessible at a time. This is sufficient for removing a desired item. As such, a cooling power, for example, may be maintained better in the interior even when an item unloading process is being carried out.

Figure 15:
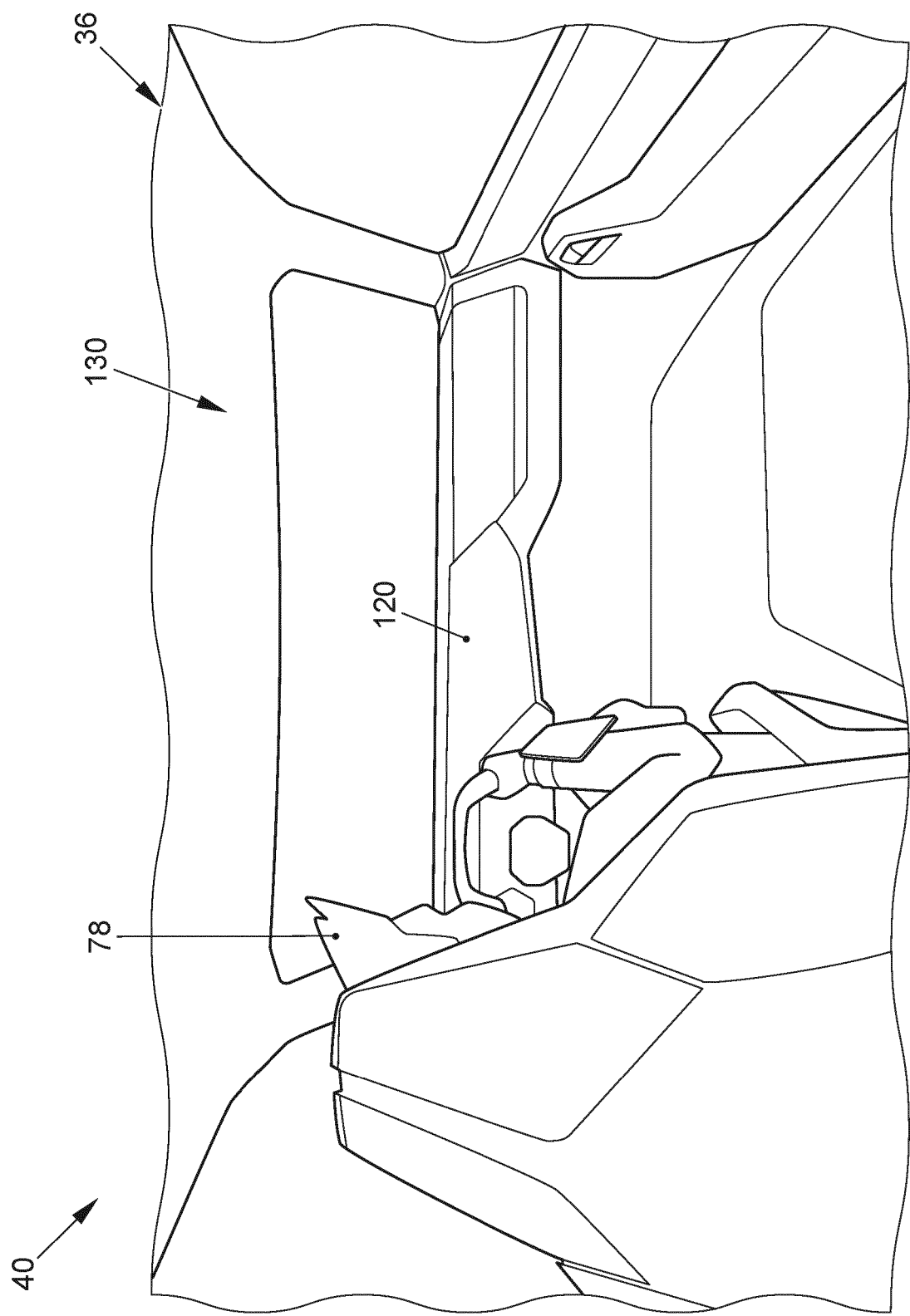
FIG. 15 is another schematic and exemplary representation of components of a logistics system.

FIG. 15 is another schematic representation of components of a logistics system 40. A vehicle interior 130 of a vehicle 36 is shown. A user 68 of the data management system 120, in this case in the form of an integrated display in the dashboard of the vehicle, is in this case the driver, who may call up or view changing customer information for example via the display.

LIST OF REFERENCE NUMERALS

10 Transport device
12 Main body
14 Side wall
16 Top element
18 Base element
20 Movement device
22 Item storage unit
24 Opening region
26 Broad side
28 Interface
30 Recessed region
32 Indented region
34 Roller
36 Vehicle
38 Item supply system
40 Logistics system
42 Receiving device
44 Thermal management device
46 Driver's cab
48 Swing door
50 Arrow in loading direction
52 Interface
54 Air supply duct
55 Unperforated central partition
56 Exhaust air duct
57 Flow arrow
58 Ventilation slot
60 Stowing space region
62 Removal duct element
64 Latching strip element
68 Cargo hatch
70 Floor
72 Pick-up location
74 Roller device
76 Outer shell
78 User
79 Removal hatch
80 External thermal management device
82 Ventilation nozzle
84 Flow arrow symbol
86 Suction nozzle
AA Center line
88 Control valve
90 First connection concept
92 Plug element
94 Socket element
96 Second connection concept
98 First induction connection element
100 Second induction connection element
102 Third connection concept
104 Wall region
106a Receiving device
106b Receiving device
108 Plug connection element
110 Securing element
112 Slot element
114 Resilient element
116 Interface element
118 Support element
120 Data management system
122 First block arrow
124 Second block arrow
126 Third block arrow
128 Mobile end device
130 Vehicle interior
200 Fourth connection concept
210 Contact head
220 Rail guide device
400 Process flow diagram
410 First step
420 Second step
430 Third step
440 Fourth step The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A logistics system for the delivery of items using a vehicle, comprising:
   an item supply system which is configured to be transported in a vehicle; and
   a data management system which is configured to link at least one item, present in at least one position in the item supply system, with at least one piece of information from at least one sales order, and is configured to link all components of the logistics system with at least one external input or output device such that they interact; wherein
   the at least one position of the at least one item in the item supply system is variable depending on the at least one piece of information from the at least one sales order;
   the at least one item is removably stored in the item supply system, wherein the data management system is configured such that it always has available a current state of the at least one piece of information from the at least one sales order; wherein
   the item supply system comprises a paternoster or at least partially comprises a paternoster; wherein
   the item supply system comprises at least one receiving device and at least one transport device, wherein the at least one receiving device is configured to receive the at least one transport device, wherein the transport device comprises a movement device and at least one item storage unit, which is configured to receive at least one item, wherein the movement device is designed to move the at least one item storage unit into at least one user-defined position in the transport device, such that the at least one position of the at least one item in the item supply system is variable depending on the at least one piece of information from the at least one sales order, and so the at least one item is removably stored in the item supply system; and wherein the receiving device comprises at least one opening device that is positioned such that the at least one item may be accessed when the at least one item storage unit reaches at least one user-defined position using the movement device depending on the at least one piece of information from the at least one sales order.

2. The logistics system of claim 1, wherein the at least one receiving device comprises at least one thermal management device, which is configured to control the temperature of the at least one transport device and at least one item storage unit at at least one user-defined position in the item supply system, wherein the thermal management device may be operated autonomously and/or via at least one interface by at least one external thermal management device.

3. The logistics system of claim 2, wherein the at least one thermal management device comprises at least one air supply duct device and at least one exhaust air duct device, such that a corresponding air flow may be generated for user-defined temperature control.

4. The logistics system of claim 3, wherein the at least one air supply duct device comprises at least one air supply duct and the exhaust air duct device comprises at least one exhaust air duct and wherein the air supply duct device comprises at least one control device, such that an air flow in the at least one air supply duct and in the at least one exhaust air duct may be controlled in a user-defined manner.

5. The logistics system of claim 2, wherein the movement device comprises a paternoster or at least partially comprises a paternoster.

6. The logistics system of claim 2, wherein the at least one transport device and the receiving device each comprise at least one interface that is configured to connect the at least one transport device to the receiving device, such that energy and/or data may be transmitted between the transport device and the receiving device and such that a connection may be established between the transport device and the thermal management device.

7. The logistics system of claim 1, wherein the movement device comprises a paternoster or at least partially comprises a paternoster.

8. The logistics system of claim 1, wherein the at least one transport device and the receiving device each comprise at least one interface that is configured to connect the at least one transport device to the receiving device, such that energy and/or data may be transmitted between the transport device and the receiving device and such that a connection may be established between the transport device and the thermal management device.

9. The logistics system of claim 8, wherein the respective at least one interface of the transport device and of the receiving device are configured compatible with one another and either may be connected with one another via a coupling mechanism and/or are designed to at least partially allow contactless transmission of energy and/or data and/or to at least partially allow a contactless connection between the transport device and the thermal management device.

10. The logistics system of claim 1, wherein the receiving device comprises at least one locking unit, such that the at least one transport device may be securely positioned as defined by the user at at least one position in the receiving device.

11. The logistics system of claim 1, wherein the at least one opening device comprises at least one signal device, such that a signal may be triggered and perceptibly set by the signal device when the at least one item storage unit has reached at least one user-defined position using the movement device depending on the at least one piece of information from the at least one sales order.

12. The logistics system of claim 1, wherein the at least one transport device comprises an at least partially closable outer shell, such that at least one item may be accessed using an access device as defined by the user and wherein the at least one transport device comprises a roller device, such that the at least one transport device may be movably stored using the roller device.

13. The logistics system of claim 1, wherein the at least one piece of information from at least one sales order is selected from one or more of: delivery location, delivery time, delivery interval, delivery condition of the at least one item, order number, and shipping position relative to at least one other item stored in the item supply system.

14. A vehicle, which is configured to accommodate the logistics system of claim 1 and to releasably integrate the logistics system at least in part in a body of the vehicle.

15. The logistics system of claim 1, wherein the at least one receiving device comprises at least one thermal management device, which is configured to control the temperature of the at least one transport device and the at least one item storage unit at at least one user-defined position in the item supply system, wherein the thermal management device may be operated autonomously and/or via at least one interface by at least one external thermal management device.

16. The logistics system of claim 1, wherein the movement device comprises a paternoster or at least partially comprises a paternoster.

17. The logistics system of claim 2, wherein the at least one transport device and the receiving device each comprise at least one interface that is configured to connect the at least one transport device to the receiving device, such that energy and/or data may be transmitted between the transport device and the receiving device and such that a connection may be established between the transport device and the thermal management device.

18. A method for operating a logistics system of comprising:

supplying at least one item in at least one position in an item supply system;

linking the at least one item with at least one piece of information from at least one sales order using a data management system;

checking, using the data management system, whether the at least one piece of information from the at least one sales order has been changed;

automatically changing the at least one position of the at least one item in the item supply system depending on the at least one piece of information from the at least one sales order; wherein the item supply system comprises a paternoster or at least partially comprises a paternoster, wherein the item supply system comprises at least one receiving device and at least one transport device, wherein the at least one receiving device is configured to receive the at least one transport device, wherein the transport device comprises a movement device and at least one item storage unit, which is configure receive at least one item, wherein the movement device is designed to move the at least one item storage unit into at least one user-defined position in the transport device, such that the at least one position of the at least one item in the item supply system is variable depending on the at least one piece of information from the at least one sales order, and so the at least one item is removably stored in the item supply system; and wherein the receiving device comprises at least one opening device that is positioned such that the at least one item may be accessed when the at least one item storage unit reaches at least one user-defined position using the movement device depending on the at least one piece of information from the at least one sales order.

* * * * *